United States Patent
Yanai et al.

(10) Patent No.: US 8,209,297 B2
(45) Date of Patent: Jun. 26, 2012

(54) DATA PROCESSING DEVICE AND METHOD

(75) Inventors: Kosuke Yanai, Kokubunji (JP);
Yasutsugu Morimoto, Kodaira (JP);
Hisashi Ikeda, Kunitachi (JP); Yosiyuki Kobayasi, Sayama (JP)

(73) Assignee: Hitachi, Ltd., Tokyo (JP)

( * ) Notice: Subject to any disclaimer, the term of this patent is extended or adjusted under 35 U.S.C. 154(b) by 200 days.

(21) Appl. No.: 12/814,721

(22) Filed: Jun. 14, 2010

(65) Prior Publication Data

US 2010/0332459 A1 Dec. 30, 2010

(30) Foreign Application Priority Data

Jun. 30, 2009 (JP) ................................. 2009-155189

(51) Int. Cl.
*G06F 17/00* (2006.01)
(52) U.S. Cl. ....................................... 707/674
(58) Field of Classification Search ................ 707/609, 707/651, 674, 705, 778, 786, 790, 802, 806, 707/821, 829
See application file for complete search history.

(56) References Cited

U.S. PATENT DOCUMENTS

| | | | |
|---|---|---|---|
| 5,794,229 A * | 8/1998 | French et al. ................... | 1/1 |
| 6,289,359 B1 | 9/2001 | Ando et al. | |
| 6,397,223 B1 | 5/2002 | Kori | |
| 7,483,890 B2 * | 1/2009 | Zhou et al. ..................... | 1/1 |
| 7,800,613 B2 * | 9/2010 | Hanrahan et al. ............. | 345/440 |
| 2003/0101171 A1 | 5/2003 | Miyamoto et al. | |
| 2008/0172408 A1 * | 7/2008 | Meliksetian et al. .......... | 707/102 |
| 2009/0089078 A1 * | 4/2009 | Bursey ............................. | 705/1 |
| 2009/0144320 A1 * | 6/2009 | Weinberg et al. ............. | 707/102 |

FOREIGN PATENT DOCUMENTS

| | | |
|---|---|---|
| JP | 2001-022766 | 1/2001 |
| JP | 2001-043237 | 2/2001 |
| JP | 2002-197099 | 7/2002 |

OTHER PUBLICATIONS

Asiki et al, An Adaptive Online System for Efficient Processing of Hierarchical Data, Jun. 11, 2009, ACM, pp. 71-80.*
Aberer et al, Infrastructure for data processing in large-scale inter-connected sensor networks, 2007 IEEE, pp. 198-205.*
Candan et al, Discovering mappings in hierarchical data from multiple sources using the inherent structure, Knowl Inf Syst 2006, pp. 1-26.*
Nestorov et al, Representative Objects: Concise Representations of Semistructured, Hierarchical Data, 1997 IEEE, pp. 79-90.*

* cited by examiner

*Primary Examiner* — Fred I Ehichioya
(74) *Attorney, Agent, or Firm* — Antonelli, Terry, Stout & Kraus, LLP.

(57) ABSTRACT

For hierarchical data including tuples each including a combination of different data types and lists each listing data of a same data type, corresponding attribute-based data divided by attribute is stored in attribute-based files whereas information on the structure of the hierarchical data is held as schema information. The schema information includes data type information on the hierarchical data structure, including data type information on each element of each tuple and data type information on only a top element of each list. The attribute-based files storing the attribute-based data are managed to be in order by a file name management table. Data on each attribute is stored in a file in a state of being hierarchized in a list format corresponding to the depth at which the each attribute is listed in the schema information. When performing analysis processing: a required attribute is specified; files of only the specified attribute are opened; the initial data structure is restored using the schema information; and data analysis processing is performed.

15 Claims, 23 Drawing Sheets

| User ID | Action | Date | Time | Acceleration in x-direction | Acceleration in y-direction | Acceleration in z-direction |
|---|---|---|---|---|---|---|
| 10505 | move | 2008/01/24 | 12:43:50 | 8.52 | 5.42 | 7.42 |
| 10505 | move | 2008/01/24 | 12:43:54 | 7.25 | 6.45 | 4.52 |
| ... | ... | | | ... | ... | ... |
| 10505 | conference | 2008/01/24 | 15:12:50 | 0.15 | 0.54 | 0.22 |
| 10505 | conference | 2008/01/24 | 15:12:58 | 0.11 | 0.58 | 0.42 |
| ... | | | | ... | ... | ... |

```xml
<user>
    <user-id>10505</user-id>
    <sessions>
        <session>
            <action>move</action>
            <date>2008/01/24</date>
            <logs>
                <log>
                    <time>12:43:50</time>
                    <x>8.52</x><y>5.42</y><z>7.42</z>
                </log>
                <log>
                    <time>12:43:54</log>
                    <x>7.25</x><y>6.45</y><z>4.52</z>
                </log>
                . . .
            </logs>
        </session>
        <session>
            <action>conference</action>
            <date>2008/01/24</date>
            <logs>
                <log>
                    <time>15:12:50</time>
                    <x>0.15</x><y>0.54</y><z>0.22</z>
                </log>
                <log>
                    <time>15:12:58</time>
                    <x>0.11</x><y>0.58</y><z>0.42</z>
                </log>
                . . .
            </logs>
        </session>
        . . .
    </sessions>
</user>
```

FIG. 5

```
(10505
   [ (move  2008/01/24
      [ (12:43:50  8.52  5.42  7.42)
        (12:43:54  7.25  6.45  4.52)
        ...
      ])
      (conference  2008/01/24
        [ (15:12:50  0.15  0.54  0.22)
          (15:12:58  0.11  0.58  0.42)
          ...
        ])
      ...
   ])
```

FIG. 8

```
(user-id
    [ (action date
        [ (time x y z) ] ) ] )
```
~105

FIG. 10 file_user-id_0.txt 1000

| ROW NUMBER | CONTENTS OF FILE |
|---|---|
| 1 | 10505 |
| 2 | 10501 |
| ... | ... |
| 15321 | 25825 | file_time_0.txt 1001

| ROW NUMBER | CONTENTS OF FILE |
|---|---|
| 1 | [ [12:43:50 12:43:54 ...] [15:12:50 15:12:58 ...] ...] |
| 2 | ... |
| ... | ... |
| 1021 | ... | file_x_0.txt 1002

| ROW NUMBER | CONTENTS OF FILE |
|---|---|
| 1 | [ [8.52 7.25 ...] [0.15 0.11 ...] ...] |
| 2 | ... |
| ... | ... |
| 2522 | ... |

DATA PROCESSING DEVICE AND METHOD

CLAIM OF PRIORITY

The present application claims priority from Japanese patent application JP 2009-155189 filed on Jun. 30, 2009, the content of which is hereby incorporated by reference into this application.

FIELD OF THE INVENTION

The present invention relates to a data processing device, and more particularly, to a data processing technique for analyzing a large amount of hierarchical data at high speed.

BACKGROUND OF THE INVENTION

With enterprises and local governments holding large amounts of data such as business logs and sensor data, there is need for techniques for extracting useful information from such large amounts of data. With advanced IT technology being available, they have been collecting larger and larger amounts of data. Data actually collected is, like XML (Extensible Markup Language) data, hierarchized. Hence, techniques which make it possible to perform complicated data analysis processing with a large amount of hierarchical data at high speed are in demand.

JP-A-2003-162545 discloses a technique for searching for and extracting required data at high speed from a tree-structured CSV (Comma Separated Values) file using an index file which stores information on head positions of data. In the technique, however, even when data only in plural specific types of fields is required, it is necessary to read data in all fields.

Techniques for high-speed cross-tabulation in an optional dimension in which a special data storing method for cross-tabulation is used are disclosed in JP-A-2002-197099 and JP-A-2001-22766. These techniques are, however, specialized in cross-tabulation, so that the techniques cannot be used to perform, at high-speed, complicated data analysis processing other than cross-tabulation. The techniques cannot be used to process hierarchical data at high speed, either.

JP-A-2001-43237 discloses a technique in which records with a specific field having a specific value are retrieved at high speed using an index indicating where in the file different attribute values are located. The technique, however, enables high-speed processing only for the purpose of record retrieval performed in cases where the number of values which can be held by fields of each record is small. Particularly, the technique does not enable high speed processing for retrieving the values of a specific field of all records included in the file. The technique cannot be used to perform high-speed processing with hierarchical data, either.

JP-A-Hei11(1999)-154155 and JP-A-2001-22617 disclose techniques for storing field data sequentially in a file and performing high-speed processing for retrieving specific field data only. The technique, however, does not enable high-speed processing with hierarchical data.

SUMMARY OF THE INVENTION

The existing techniques referred to above do not enable complicated data analysis processing at high speed with hierarchical data.

In processing a large amount of data, reading or writing a large amount of data becomes a bottleneck which causes the processing speed to decrease. As a way of avoiding such a problem in processing hierarchical data, reducing the amount of data to be read or written and allowing data required for each processing operation to be read sequentially will be effective.

The present invention has been made in view of the above consideration, and it is an object of the invention to provide a data processing device and a data processing method for performing complicated data analysis processing at high speed with a large amount of hierarchical data.

To achieve the above object, the present invention provides a data processing device, comprising: a hierarchization processing section which outputs hierarchical data generated from raw data, the hierarchical data including a tuple and a list, the tuple including a combination of different data types, the list listing data of a same data type, and schema information representing a data structure of the hierarchical data; a data division processing section which outputs attribute-based data generated from the hierarchical data and the schema information and divided by attribute; and a storage section which stores the schema information outputted by the hierarchization processing section and the attribute-based data outputted by the data division processing section. In the data processing device, the attribute-based data stored in the storage section includes a group of files storing data and a file name management table managing file names of the group of files with each of the group of files storing data of one attribute only.

In the data processing device provided by the present invention, data of each attribute stored in the group of files is, in a list format, hierarchized corresponding to a depth at which the each attribute is listed in the schema information; and, among the group of files each storing data of one attribute only, files associated with each attribute are ordered such that, by orderly opening and reading, in accordance with appropriate delimiters provided, files associated with a first optional attribute and files associated with a second optional attribute, correspondence between the first optional attribute and the second optional attribute in the hierarchical data can be restored.

Furthermore, to achieve the above object, the data processing device provided by the present invention further comprises: a hierarchical data restoration processing section which outputs hierarchical data restructured by restoring an initial hierarchical structure using a data analysis script describing data analysis processing, the schema information, and the attribute-based data divided by attribute; and an analysis processing section which performs data analysis processing using the data analysis script and the restructured hierarchical data and outputs an analysis result.

Namely, to achieve the above object, a preferred embodiment of the present invention provides a data processing device for processing data. The data processing device comprises: a hierarchical data restoration processing section which outputs hierarchical data restructured by restoring an initial hierarchical structure using a data analysis script describing data analysis processing, schema information representing a data structure of hierarchical data to be restructured, and attribute-based data divided by attribute; and an analysis section which performs analysis processing using the data analysis script and the restructured hierarchical data. The hierarchical data to be restructured has a recursive structure including tuples each including a combination of different data types and lists each listing data of a same type. The schema information includes data type information on the hierarchical data structure to be restored, including data type information on each element of each tuple and data type information on only a top element of each list. The attribute-based data includes a group of files storing data and a file name management table managing file names of the group of files, each of the group of files storing data of one attribute only. In the group of files, data of each attribute is, in a list format, hierarchized corresponding to a depth at which the each attribute is listed in the schema information. Among the group of files each storing data of one attribute only, files associated with each attribute are ordered such that, by orderly opening and reading, in accordance with appropriate delimiters provided, files associated with a first optional attribute and files associated with a second optional attribute, the correspondence to be restored between the first optional attribute and the second optional attribute in the hierarchical data can be restored. In the hierarchical data restoration processing performed by the hierarchical data restoration processing section, an attribute required for data analysis is specified, and no file associated with an attribute other than the specified attribute is read. The data hierarchized in the list read from the group of files is transposed at a specified depth to restructure the data. In the restructured hierarchical data, attributes not required for data analysis processing assume arbitrary values.

According to the present invention, it is possible to sequentially read only the data required for data analysis processing out of data in a hierarchical structure, so that the amount of data to be read can be reduced to achieve a higher processing speed. Even when a large number of data fields are involved, the processing speed does not excessively drop.

Even when it becomes necessary to process an additional field, only the additional field can be outputted to a new file without being required to write all fields, so that the amount of data to be written can be reduced to achieve a higher processing speed.

Furthermore, the invention can be applied to a distributed computing environment, for example, MapReduce without changing the constitution of the invention, so that the processing speed can be further increased by adopting distributed processing.

BRIEF DESCRIPTION OF THE DRAWINGS

FIG. 4 shows an example of data representation in XML format according to the first embodiment;

FIG. 5 shows example hierarchical data according to the first embodiment;

FIG. 8 shows example schema information according to the first embodiment;

FIG. 10 shows example contents of files storing attribute values according to the first embodiment;

DETAILED DESCRIPTION OF THE PREFERRED EMBODIMENTS

Embodiments of the present invention will be described below with reference to drawings. In this specification, functional processing realized by using a program in a processing section of a data processing device such as a computer may be referred to as a "processing section" or "processing unit." Hierarchization processing, for example, may be referred to as a "hierarchization section."

First Embodiment

A first embodiment of the present invention is a data processing device in which data in a hierarchical structure is analyzed at a high speed on a computer.

The data processing device of the first embodiment will be described below. The data processing device includes a device which pre-processes data into a computer-processable format and a device which receives source code as a data analysis script and performs data analysis. The device to pre-process data into a computer-processable format will be described later with reference to FIG. 1. The device to receive source code as a data analysis script and perform data analysis will be described later with reference to FIG. 2.

Figure 24:
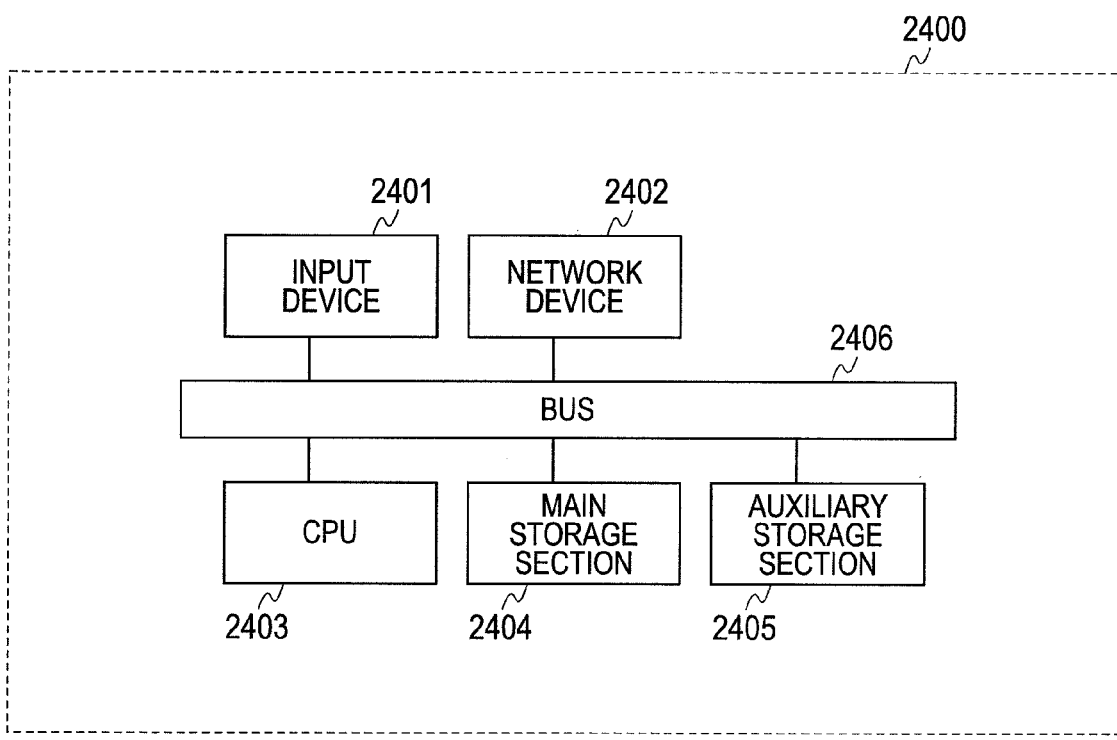
FIG. 24 shows an example configuration of a computer according to the first and second embodiments.

The computer included in the data processing device of the present embodiment is a general-purpose computer configured, for example, as shown in FIG. 24. In FIG. 24, reference numeral 2400 denotes a computer in which an input device 2401 used as an input section including, for example, a keyboard and a mouse, a network device 2402 used as an interface section for connection to a network, for example, the Internet, a central processing unit (CPU) 2403 used as a processing section, a main storage 2404, and an auxiliary storage 2405, the last two being used as storage sections, are connected to an internal bus 2406. More devices, for example, a display device to be used as an output section may be added to the above configuration as required. The CPU 2403 performs various types of data processing, being described in the following, by executing programs stored in or downloaded to the storage sections.

Figure 1:
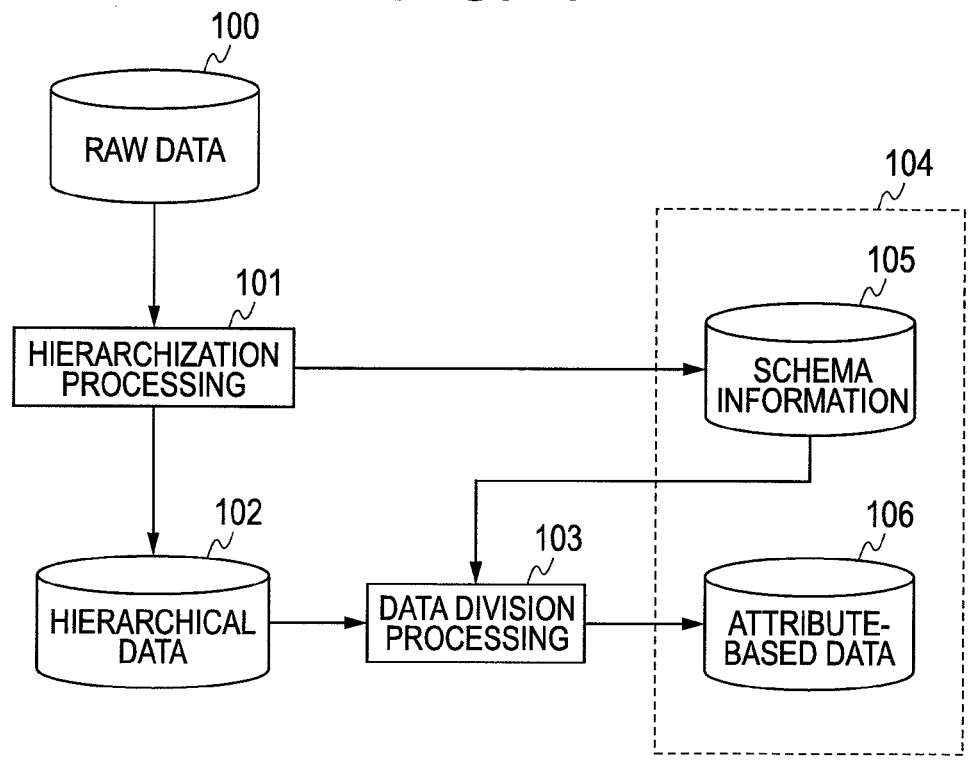
FIG. 1 is a block diagram of a device to pre-process data into a computer-processable format according to a first embodiment of the invention.

FIG. 1 is a block diagram of an example configuration of the device to pre-process data into a computer-processable format. The computer making up the device shown in FIG. 1 may be either the same as or different from the computer making up the device shown in FIG. 2. In FIG. 1, hierarchization processing 101 and data division processing 103 are processing sections which are realized as program processing performed in the CPU 2403. The processing blocks shown in FIG. 2 and subsequent drawings are also processing sections realized as program processing performed in the CPU 2403.

Raw data 100, hierarchical data 102, schema information 105, and attribute-based data 106 is collected and stored in storages sections such as the main storage 2404 and the auxiliary storage 2405. Namely, the raw data 100 received undergoes the hierarchization processing 101 and, as a result, the hierarchical data 102 and the schema information 105 is outputted. Subsequently, the hierarchical data 102 and the schema information 105 undergoes the data division processing 103 in the processing section and, as a result, the attribute-based data 106 is outputted.

According to the first embodiment, the raw data 100 is pre-processed as shown in FIG. 1 only once, and the schema information 105 and the attribute-based data 106 combined is stored, under control by the computer, as combination data 104 to be analyzed. In a case where the hierarchical data 102 and the schema information 105 is provided as input data, the hierarchical data 102 and the schema information 105 may undergo the data division processing 103 skipping the hierarchization processing 101.

Figure 3:
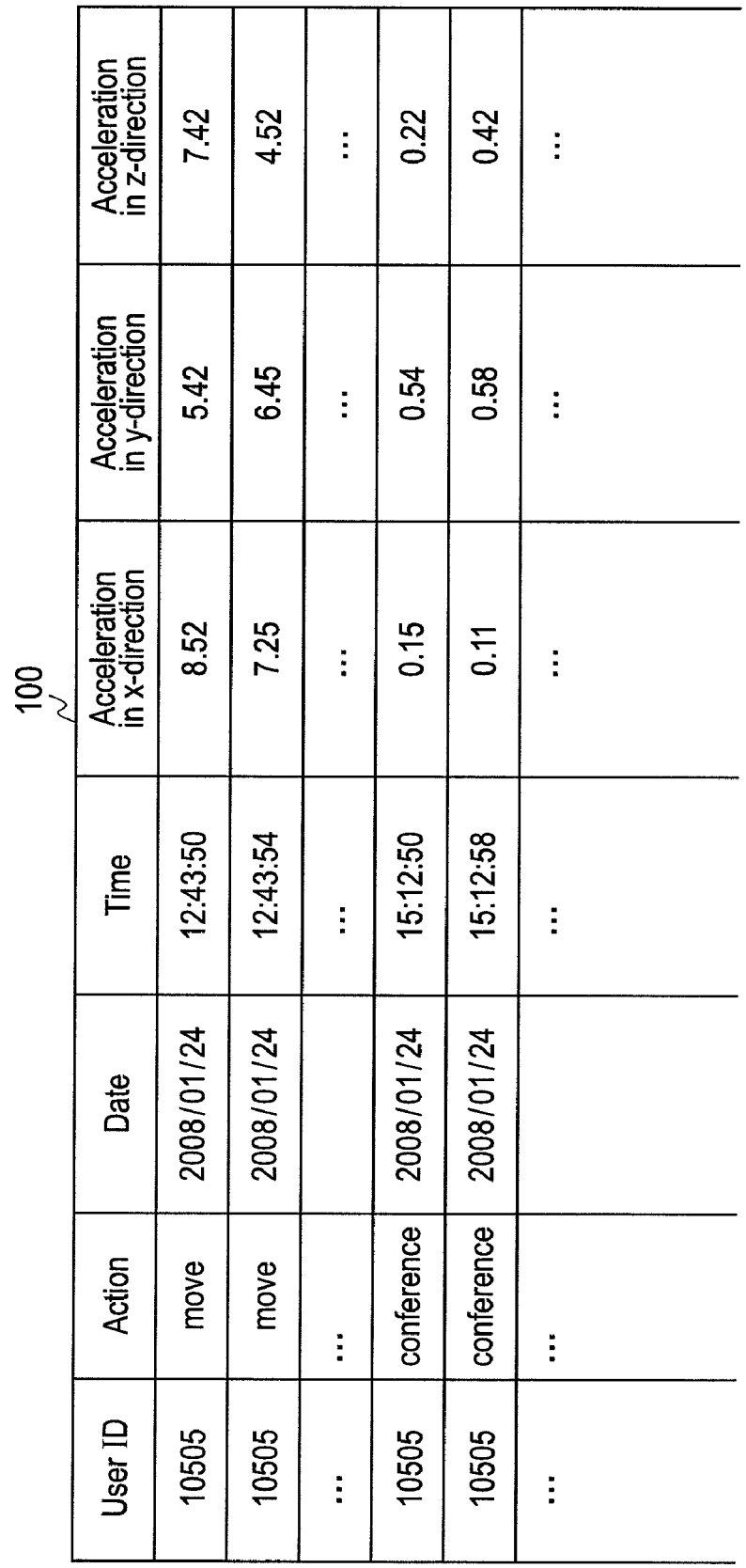
FIG. 3 shows example raw data according to the first embodiment.

The following description is based on the assumption that the raw data 100 represents the data shown in FIG. 3, even though the present embodiment is obviously applicable also to data different from that shown in FIG. 3. The raw data 100 shown in FIG. 3 is a log of acceleration measured by an acceleration sensor worn by a user. The log includes, as listed in the first row of the raw data 100 shown in FIG. 3, records of "user id," "action," "date," "time," "acceleration in x-direction," "acceleration in y-direction," and "acceleration in z-direction." Even though the data shown in FIG. 3 is on a single user, the raw data 100 actually includes data on plural users.

In the hierarchization processing 101 shown in FIG. 1, the raw data 100 tabulated as shown in FIG. 3 is converted into a hierarchical data format, for example, XML referred to in the foregoing. FIG. 4 shows the data in XML format obtained by grouping the raw data 100 shown in FIG. 3 using the user id, action, and data as keys and converting the grouped data into XML format.

To obtain the data in XML format shown in FIG. 4 from the raw data shown in FIG. 3, first the rows of the raw data are grouped by user id, then the rows of data associated with each user id is further grouped by action and date. What is to be done in the hierarchization processing 101 is determined by the user to carry out data analysis in the present embodiment by taking the purpose of data analysis into consideration. The user to carry out the data analysis processing determines, for example, XML tag names and attributes to be used as keys for grouping.

FIG. 5 shows the data obtained by replacing the XML tags included in the XML data shown in FIG. 4 with parentheses "(" and ")" or brackets "[" and "]". Parentheses are used for a combination of different types of data, whereas brackets are used for repetitions of a same type of data. In the following description, a combination of different types of data represented using parentheses will be referred to as a tuple, and repetitions of a same type of data represented using brackets will be referred to as a list. In the present embodiment, data is hierarchically (recursively) represented using lists and tuples.

FIG. 5 shows a hierarchical data structure including lists and tuples represented using parentheses and brackets. There are also many other expressions including XML than parentheses and brackets that can be used to represent a hierarchical data structure including lists and tuples.

Figure 6:
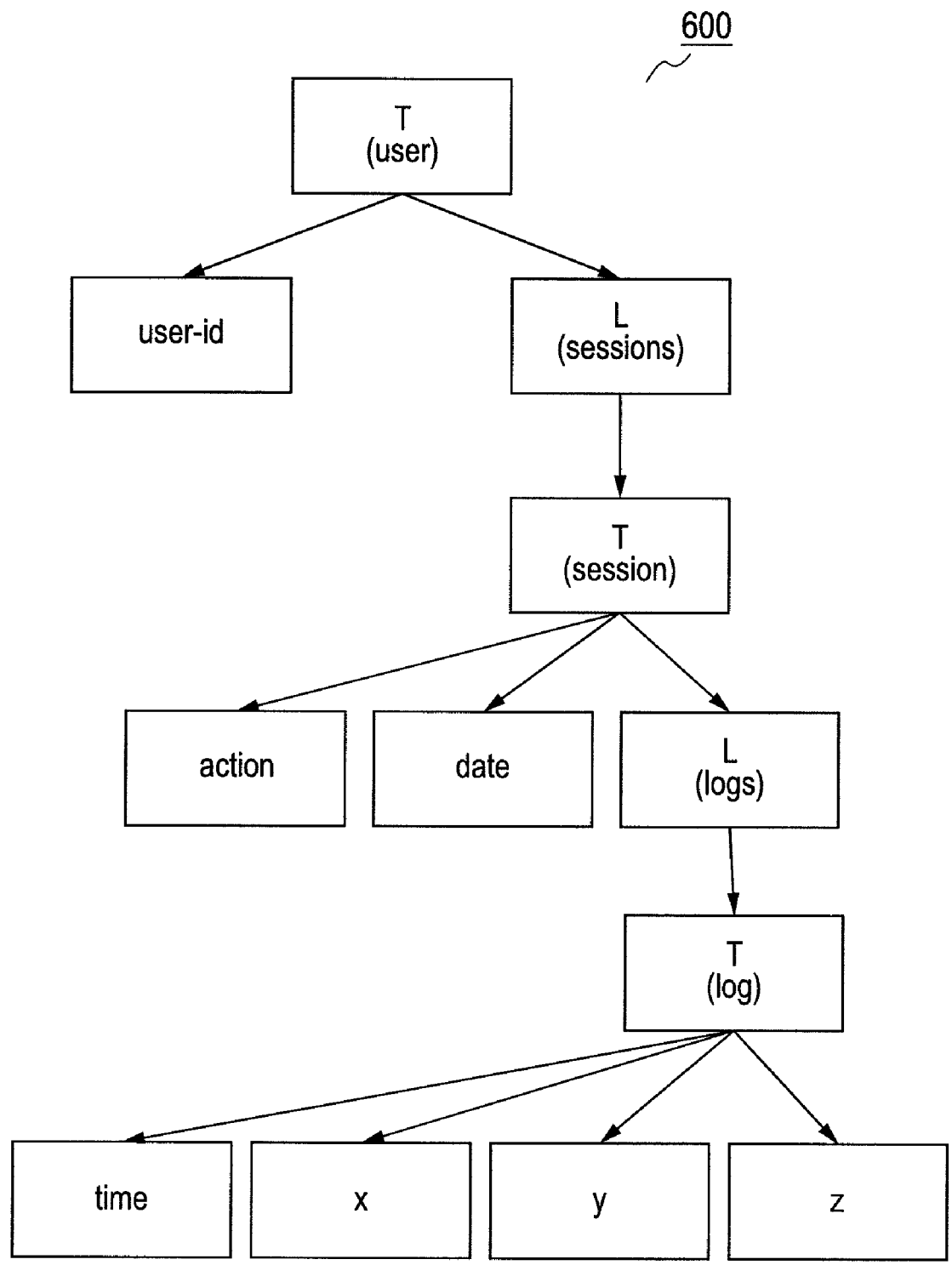
FIG. 6 schematically shows an example data structure according to the first embodiment.

FIG. 6 schematically shows a one-user portion of data structure 600 corresponding to the data shown in FIG. 5. In the data structure 600, a tuple is denoted by T, and a list is denoted by L. Each node name corresponds to an XML tag name included in the XML data shown in FIG. 4. As for the elements of each list which include repetitions of a same data type, only the first element is written with the subsequent elements omitted.

Figure 7:
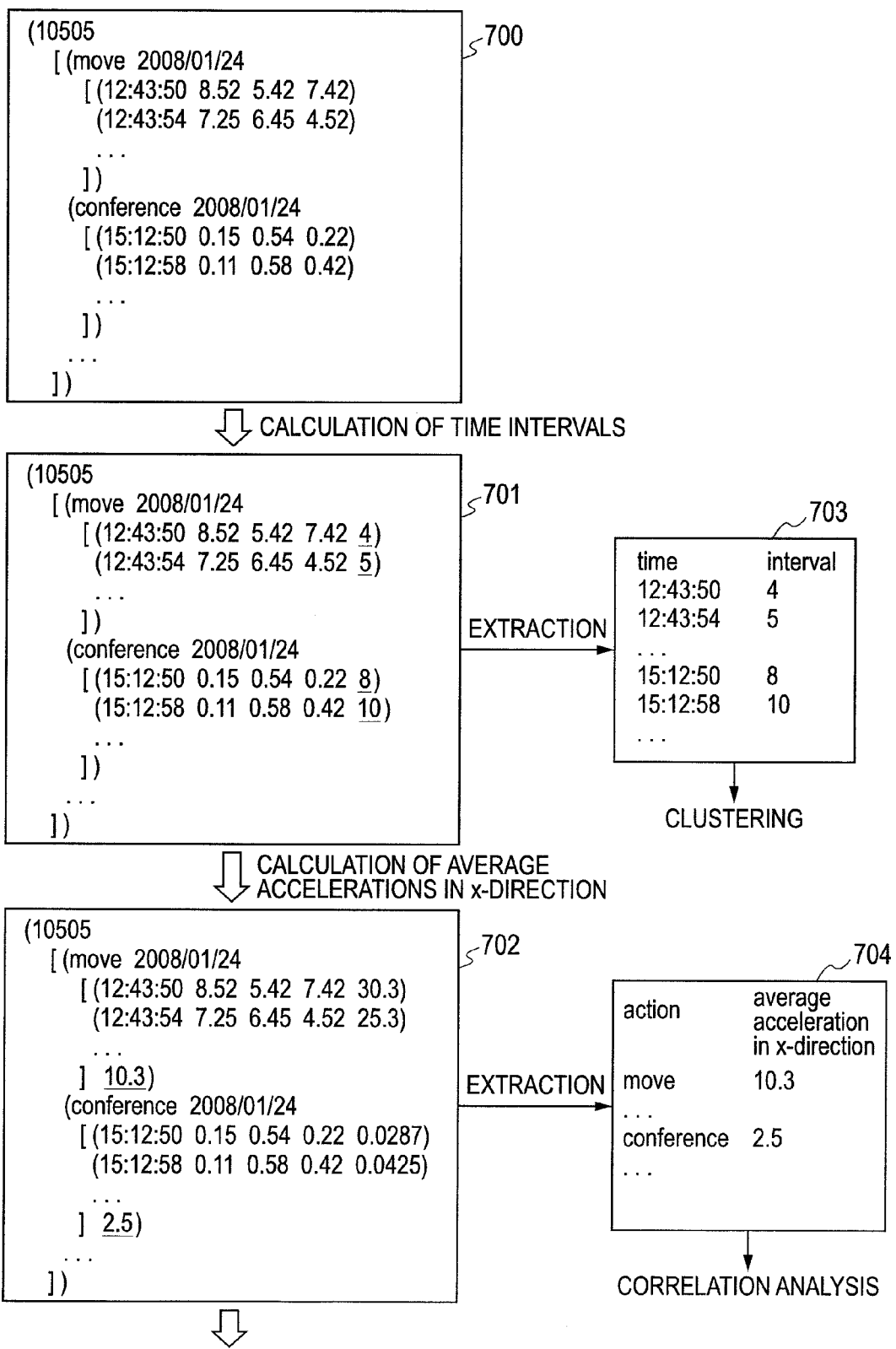
FIG. 7 shows an example of data analysis which may be performed according to the first embodiment.

FIG. 7 shows an example of data analysis which may be performed by the data processing device of the first embodiment. According to the example data analysis shown in FIG. 7, in the first analysis stage, time intervals, i.e. time differences between log tags included in the XML data shown in FIG. 4, are calculated for data 700 obtained by subjecting the raw data to the hierarchization processing 101, and, as a result, data 701 inclusive of the time intervals thus calculated is outputted. In the data 701 shown in FIG. 7, the values of additional data, i.e. the time interval values, are underlined. In the second analysis stage, from the data 701 including the time interval values as additional data, time and time interval values are extracted for each logs tag included in the XML data shown in FIG. 4, and the extracted time and time interval values are clustered by a known method, for example k-means. In the third analysis stage, for the data 701 including the time interval values as additional data, the values of acceleration in the x-direction within each logs tag included in the XML data shown in FIG. 4 are averaged, and, as a result, data 702 including the average values of acceleration in the x-direction thus calculated is outputted. In the data 702 shown in FIG. 7, the values of additional data, i.e. the average acceleration values are underlined. As is known by comparing the data 701 and data 702 shown in FIG. 7, data can be added to any hierarchical level. In the fourth analysis stage, from the data 702 including the average values of acceleration in the x-direction as additional data, action information and the average values of acceleration in the x-direction are extracted, and the extracted information and data is subjected to correlation analysis by a known method, for example, by calculating a correlation function.

In the example of data analysis shown in FIG. 7, data of only a few specific attributes is processed and the values obtained as calculation results are added as new attribute values to an optional hierarchical level or are delivered to different known processing. In the first embodiment, it is possible to make processing faster for data analysis which involves only a few specific attributes by pre-processing required data so as to divide the data by attribute and store the divided data.

Figure 8:
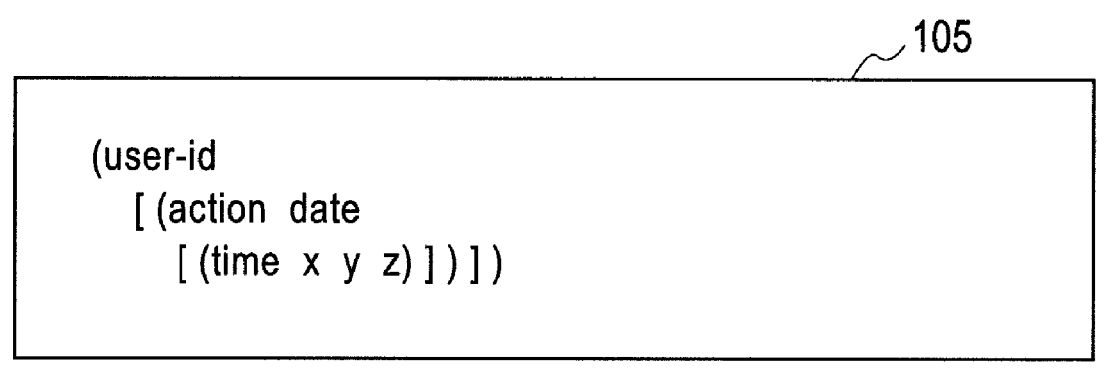

FIG. 8 shows the schema information 105 based on the raw data shown in FIG. 3. The schema information 105 shown in FIG. 8 represents the data structure schematically shown in FIG. 6 using parentheses and brackets to facilitate programming. It only includes tags extracted from the XML data shown in FIG. 4. In the present embodiment, such schema information 105 can be automatically generated by executing the hierachization processing 101 determined by an implementer of the present embodiment.

Figure 9:
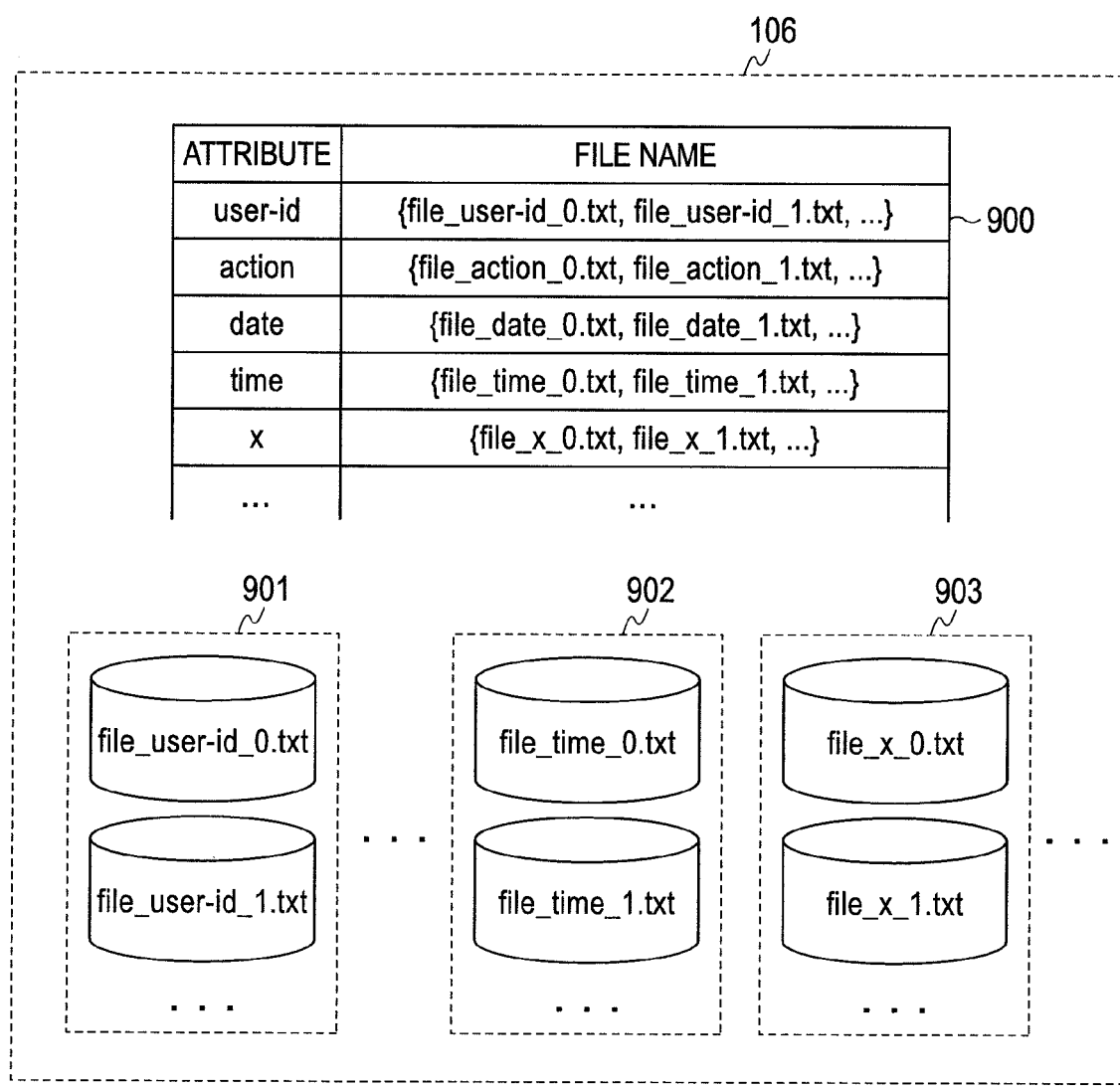
FIG. 9 shows example attribute-based data according to the first embodiment.

FIG. 9 shows an example of attribute-based data 106 generated from the hierarchical data 102 and schema information 105 based on the raw data shown in FIG. 3 by performing the data division processing 103. The attribute-based data 106 is managed using a file name management table 900 and file groups (for example, 901, 902, and 903) storing attribute values. The file group 901 includes files storing the values of user-id tags included in the XML data shown in FIG. 4. The file group 902 includes files storing the values of time tags included in the XML data shown in FIG. 4. The file group 903 includes files storing the values of x tags included in the XML data shown in FIG. 4. The file name management table 900 includes information indicating which tag values included in the XML data shown in FIG. 4 are stored in which files. It can be known by referring to the file name management table 900, for example, that the values of time tags included in the XML data shown in FIG. 4 are sequentially stored in files file_time__0.txt, file_time__1.txt, - - - .

FIG. 10 shows the contents of files storing attribute values on the assumption that the data shown in FIG. 3 is used as the raw data. In FIG. 10, reference numeral 1000 at the top denotes the contents of file_user-id 0.txt holding a user ID in each row. Reference numeral 1001 below the reference numeral 1000 denotes the contents of file_time__0.txt holding time data on a user in each row. Since the time data on each user is dually hierarchized in the logs and sessions lists shown in FIG. 6, the list data in each row of file_time__0.txt has a depth of 2. Reference numeral 1002 shown below the reference numeral 1001 denotes the contents of file_x__0.txt holding, in each row, the values of acceleration in the x-direction measured on each user. Since the values of acceleration in they-direction measured on each user are dually hierarchized in the logs and sessions lists shown in FIG. 6, the list data in each row of file_x__0.txt has a depth of 2.

Figure 11:
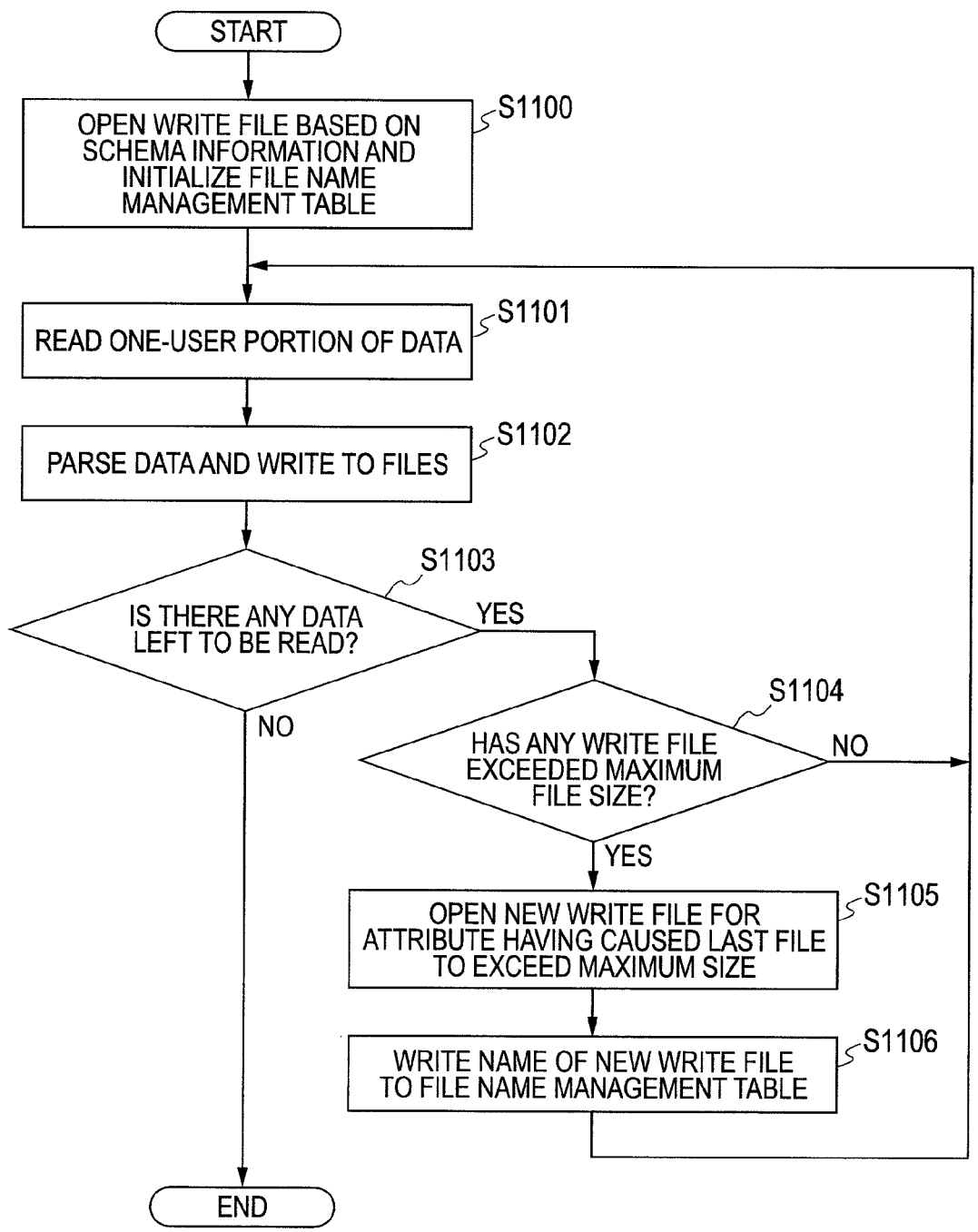
FIG. 11 is a flowchart of data division processing according to the first embodiment.

FIG. 11 is a flowchart of the data division processing 103 shown in FIG. 1 to be executed by the CPU. First, in step S1100, write files are opened based on the schema information 105, and the file name management table is initialized. When the schema information 105 is as shown in FIG. 8, file_user-id__0.txt, file_action__0.txt, file_date__0.txt, file_time__0.txt, file_x__0.txt, file_y__0.txt, and file_z__0.txt are opened as write files, and these file names are written in the file name management table 900. For example, when the schema information shown in FIG. 8 is read, "user-id" is read as the first character string, causing file_user-id.txt to be opened as a write file and a record having an attribute field user-id and a file name field {file_user-id.txt} is added to the file name management table 900.

Next, in step S1101, a one-user portion of data is read from the hierarchical data 102. In the following description, it is assumed that the hierarchical levels of data to be read are represented using parentheses and brackets as shown in FIG. 5. Obviously, however, the present embodiment can also be realized by other means than parentheses and brackets, namely, by using a data format, for example, XML, which can represent an arbitrary hierarchical structure.

Then, in step S1102, the hierarchical data 102 read in is subjected to structural analysis, and is written to files after being divided by attribute. The processing in step S1102 is performed by calling a recursive function parse with an argument included in the hierarchical data 102 read in. The recursive function parse will be described later with reference to FIG. 12.

Next, in step S1103, execution branches conditionally according to whether or not there is data left to be read. When no data is left to be read, the data division processing 103 is terminated. When there is data left to be read, execution branches, in step S1104, conditionally according to whether or not any write file has exceeded a predetermined maximum file size. When there is no write file which has exceeded the maximum file size, execution returns to step S1101. When there is any write file which has exceeded the maximum file size, a new write file is opened, in step S1105, for the attribute associated with the write file that has exceeded the maximum file size. For example, in a case where file_date__0.txt has exceeded a predetermined maximum file size, file_date__1.txt is opened as a new write file, and, in step S1106, the new write file name, file_date__1.txt, is added to the file name management table 900 as the name of the new write file for the attribute that caused file_date__0.txt to exceed the maximum file size.

For example, when file_date__0.txt exceeds a maximum file size, in the file name management table 900, the contents of the file name field in the record with an attribute field date are changed to {file_date__0.txt, file_date 1.txt}. In the file name field, the file names are sequentially listed from left to right with the oldest file coming in the leftmost position. Therefore, the order of file names read from left to right corresponds to the order of user IDs included in the hierarchical data. Specifying a maximum file size causes data to be divided and stored in plural files. This makes data backup or duplication operation and distributed data processing easier. When the processing in step S1106 is finished, execution returns to step S1101.

Figure 12:
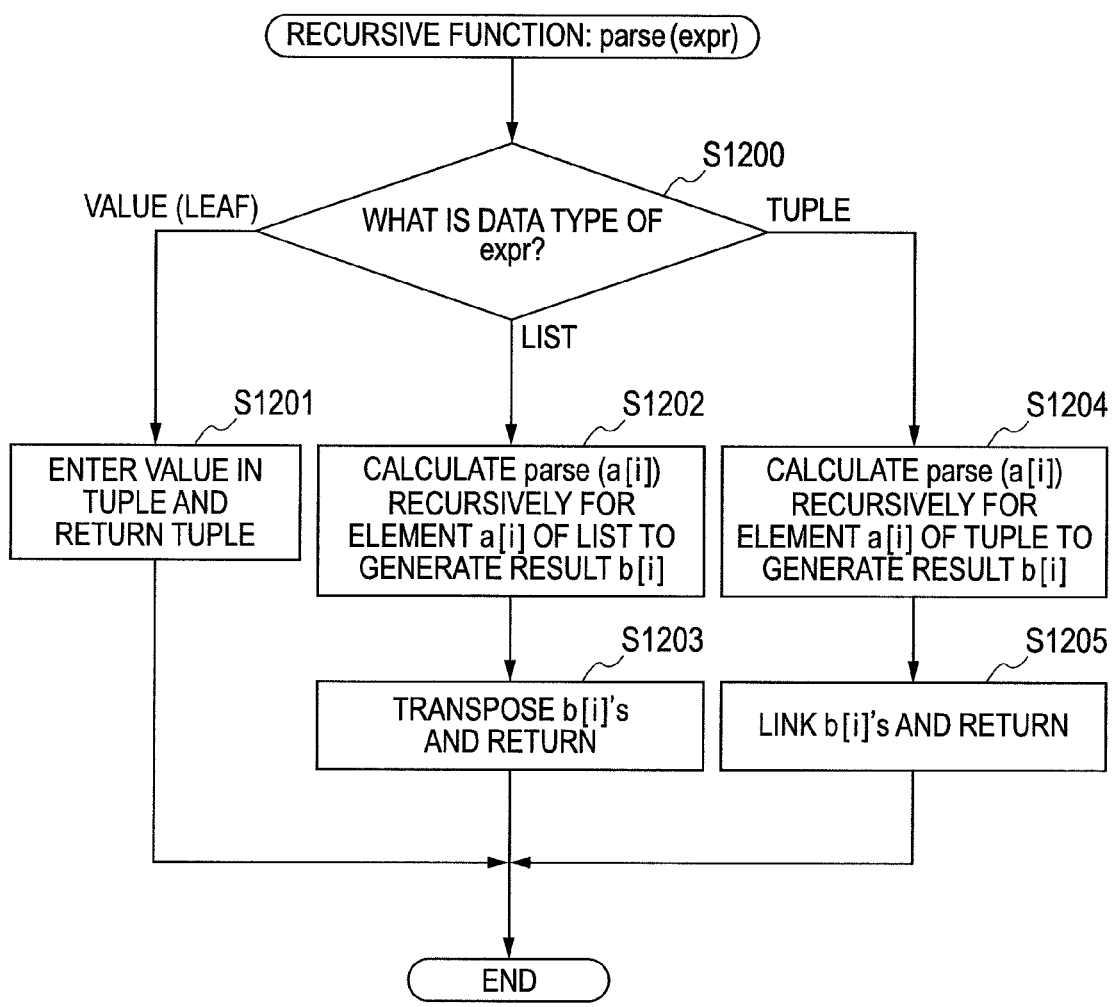
FIG. 12 is a flowchart of recursive function parse according to the first embodiment.

FIG. 12 is a flowchart of the recursive function parse called in step S1102. In step S1102, the recursive function parse is called with an argument included in the hierarchical data 102. First, in step S1200, execution of the recursive function branches conditionally according to the top-level argument data type in the data hierarchy. When the argument data type is value, the value is entered in a tuple and the tuple is returned in step S1201. The parse function is recursively called for hierarchical data, so that, at the lowest level of a hierarchical structure, it is called with an argument including a value only.

When, in step S1200 for conditional branching, the argument data type is found to be list, parse (a[i]) is recursively called for each element a[i] of the list, and the value calculated each time is returned as b[i] in step S1202. Next, in step S1203, b[i]'s calculated in step S1202 are transposed and returned. When, for example, parse ([1 2 3]) is executed, since the argument is a list, parse is recursively called for each of elements 1, 2, and 3 causing parse (1), parse (2), and parse (3) to be calculated. When parse (1) the argument for which is a value is executed, execution branches, in step S1200, to step S1201. In step S1201, value 1 is entered in a tuple and the result, b[0]=(1), with value 1 entered in the tuple is returned. Similarly, b[1]=(2) and b[2]=(3) are subsequently returned. When, in step S1203, b[i]'s are transposed, they are converted as a matrix as follows.

[(1) (2) (3)]→([1 2 3])

As a matrix, [(1) (2) (3)] has three rows and one column, whereas ([1 2 3]) has one row and three columns, representing a result of transposition.

When, in step S1200 for conditional branching, the argument data type is found to be tuple, parse (a[i]) is recursively called for each element a[i] of the tuple, and the value calculated each time is returned as b[i] in step S1204. Then, in step S1205, the tuple in which b[i]'s are linked is returned. For example, when parse ((1 2 3)) is executed, since the argument is a tuple, parse is recursively called for each of the elements 1, 2, and 3 included in (1 2 3) causing parse (1), parse (2), and parse (3) to be calculated. When parse (1) the argument for which is a value is executed, execution branches, in step S1200, to step S1201. In step S1201, value 1 is entered in the tuple and the result, b[0]=(1), with value 1 entered in the tuple is returned. Similarly, b[1]=(2) and b[2]=(3) are subsequently returned. When, in step S1205, b[i]'s are linked, they are converted as follows.

((1) (2) (3))→(1 2 3)

Figure 13:
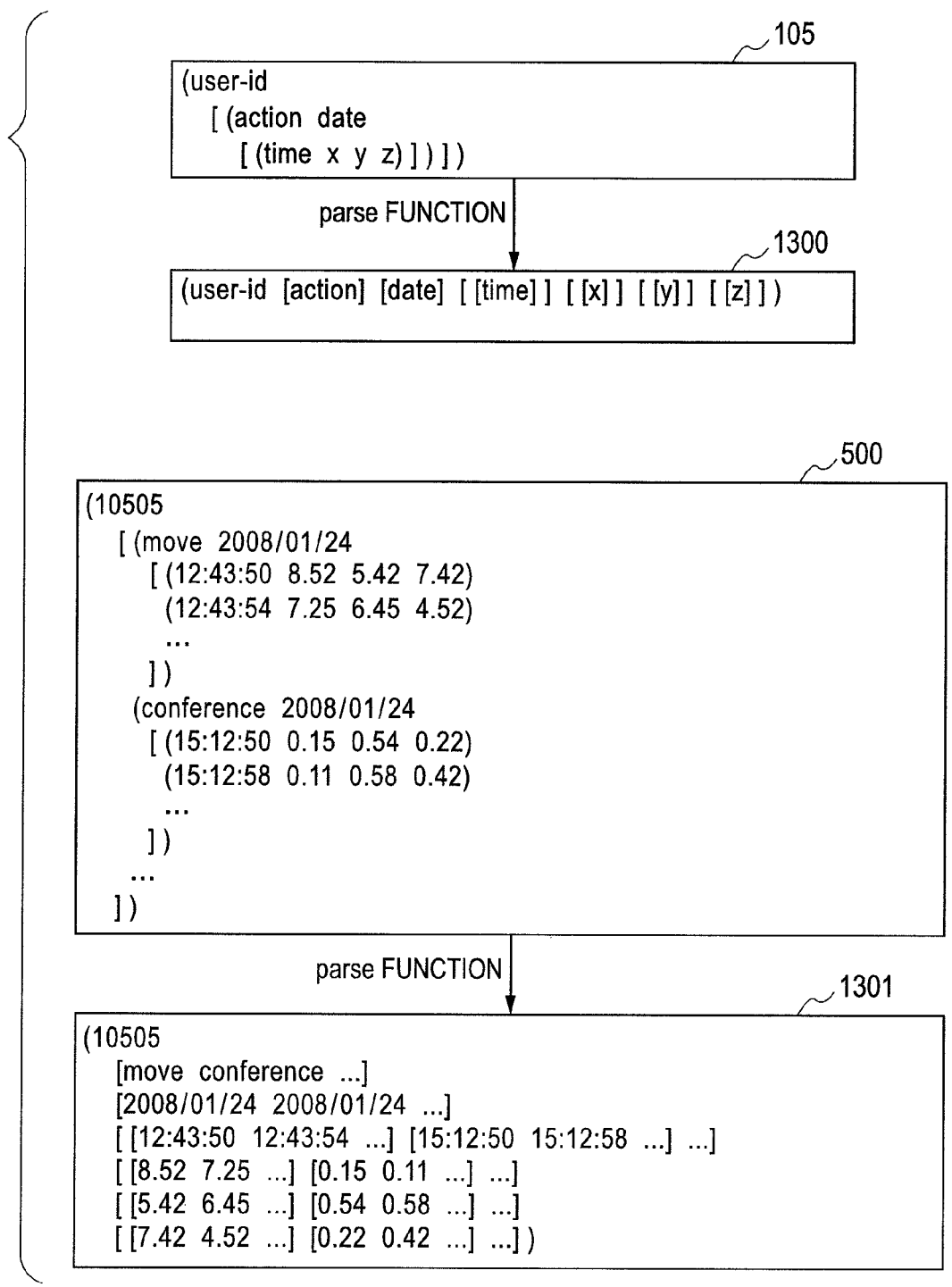
FIG. 13 shows how the recursive function parse works according to the first embodiment.

FIG. 13 shows how the parse function works. As shown in an upper part of FIG. 13, when the parse function is applied to the schema information 105, the attribute names (corresponding to the tag names included in the XML data shown in FIG. 4) included in the schema information are sequentially extracted (1300). Each of the attribute names is attached with a number of pairs of brackets, the number representing the depth of the attribute in the list. Attribute time, for example, is at depth 2 in the list included in the schema information 105, so that it is attached with two pairs of brackets in the attribute name data 1300 outputted.

As shown in a lower part of FIG. 13, when the parse function is applied to hierarchical data 500, resultant data 1301 is outputted in the write file format shown in FIG. 10. In the output data 1301, the data is divided by attribute. The order of attribute names in the output data 1300 and the order of attribute values in the output data 1301 mutually correspond, so that it can be known which data is to be written in which file.

Figure 14:
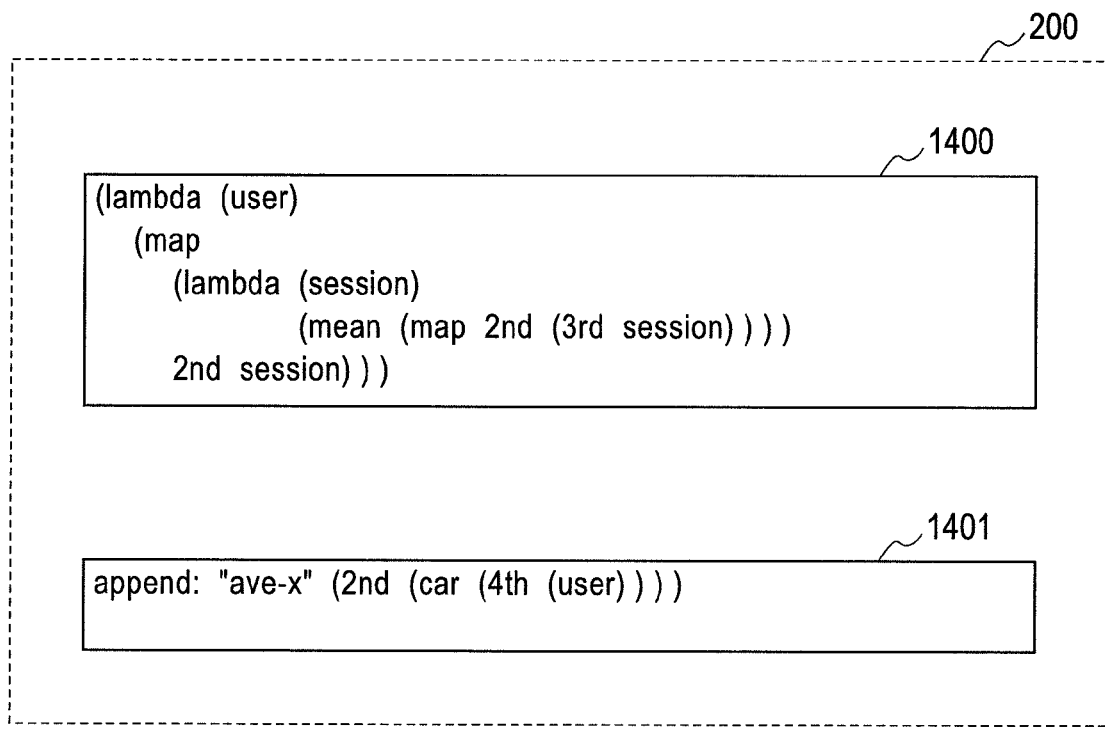
FIG. 14 shows example data analysis source code according to the first embodiment.

The following description will be provided based on the data analysis source code shown in FIG. 14. Even though the data analysis source code shown in FIG. 14 is written in programming language LISP, obviously, the present embodiment is also applicable to script and data analysis source code written in a programming language other than LISP. In terms of the contents of data analysis, too, the present embodiment is obviously applicable to analysis processing different from that shown in FIG. 14, too. In FIG. 14, reference numeral 1400 denotes an example program portion for data analysis. The example program 1400 is for calculating average values of acceleration in the x-direction. Reference numeral 1401 denotes how values obtained by the processing of 1400 are treated. In the example of 1401, the values obtained by the processing of 1400 are t be added with an attribute name "ave-x" to the positions denoted by (2nd (car (4th (user)))) In 1401, "2nd" represents a function for returning the second element of the tuple; "3rd" represents a function for returning the third element of the tuple; and "4th" represents a function for returning the fourth element of the tuple. Other program commands shown in FIG. 14 are generally used ones in LISP, so that their detailed descriptions are omitted in this specification.

Figure 15:
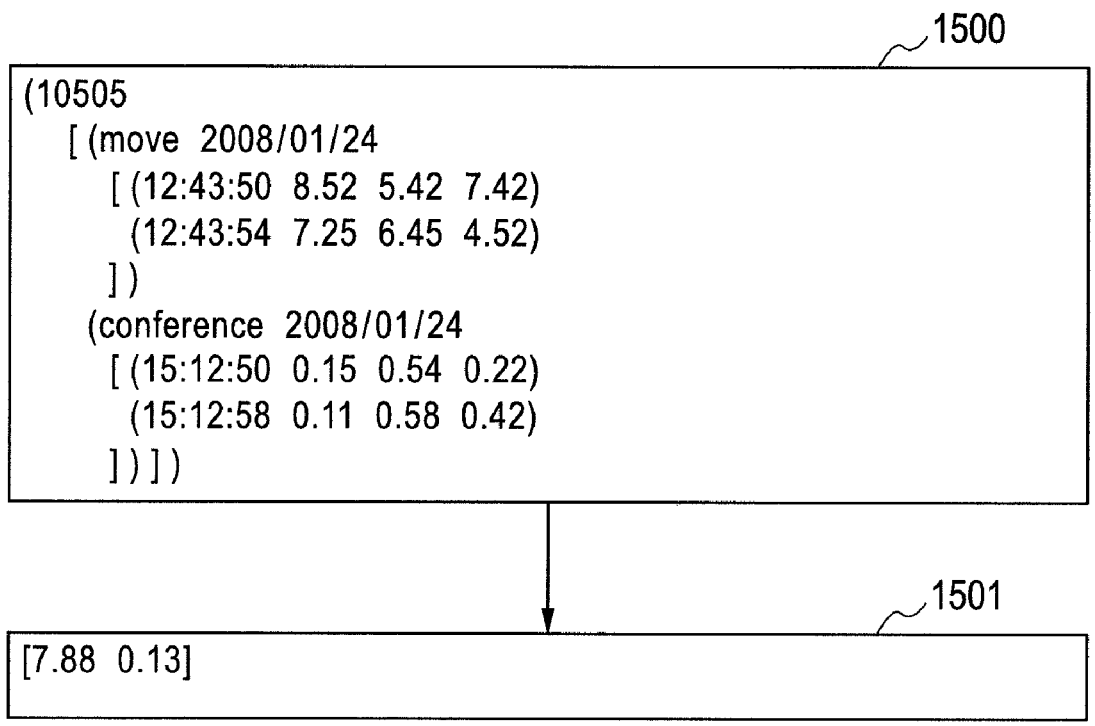
FIG. 15 shows an example operation of a data analysis program according to the first embodiment.

FIG. 15 shows an example operation of the program 1400. When hierarchical data 1500 is inputted to the program 1400, average values of acceleration in the x-direction are calculated and a list 1501, listing calculation results, is outputted.

In the present embodiment, hierarchical data is divided by attribute beforehand to be kept under control in the format of the attribute-based data 106 as shown in FIG. 9. It is therefore necessary to restore the hierarchical data structure before the data analysis program can be applied to the data.

Figure 2:
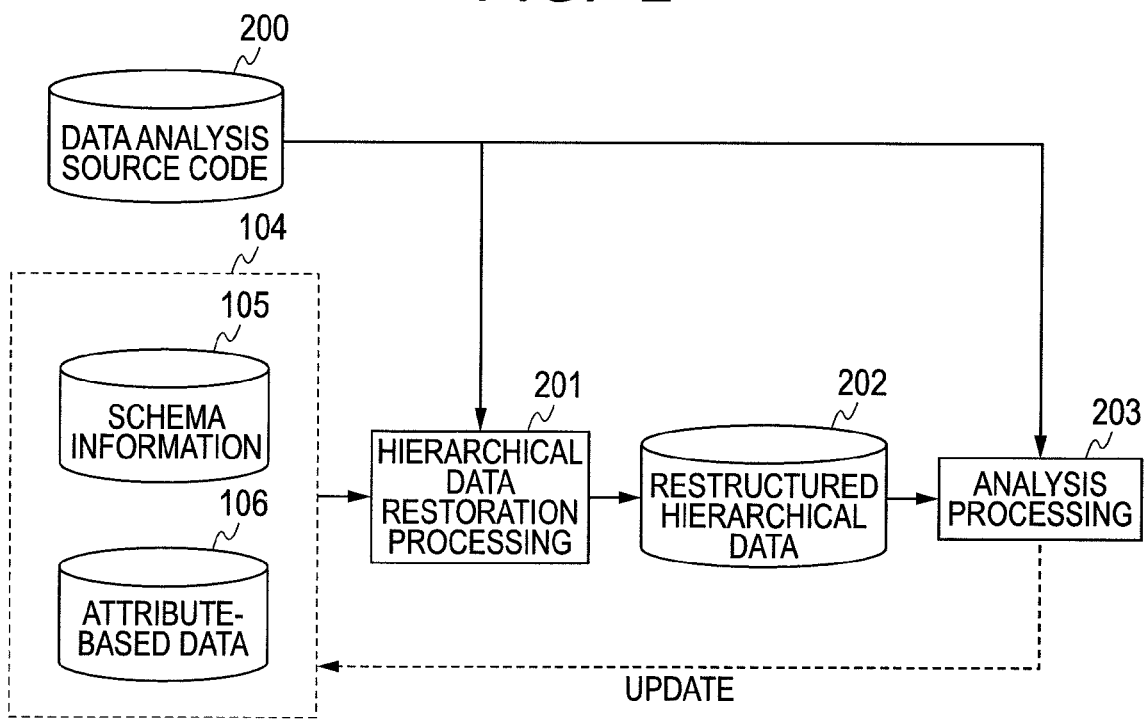
FIG. 2 is a block diagram of a device to receive data analysis source code and perform data analysis according to the first embodiment.

FIG. 2 is a block diagram of a device for receiving source code as a data analysis script and performing data analysis. As shown in FIG. 2, restructured hierarchical data 202 is obtained by performing hierarchical data restoration processing 201 using the data analysis source code 200 and the schema information 105 and attribute-based data 106 generated by the processing shown in FIG. 1. Next, analysis processing 203 is performed using the data analysis source code 200 and the restructured hierarchical data 202. The results of performing the analysis processing 203 are stored in a storage section or are outputted from an appropriate output section. In cases where additional attributes are used in the analysis processing, the schema information 105 and the attribute-based data 106 is updated.

Figure 16:
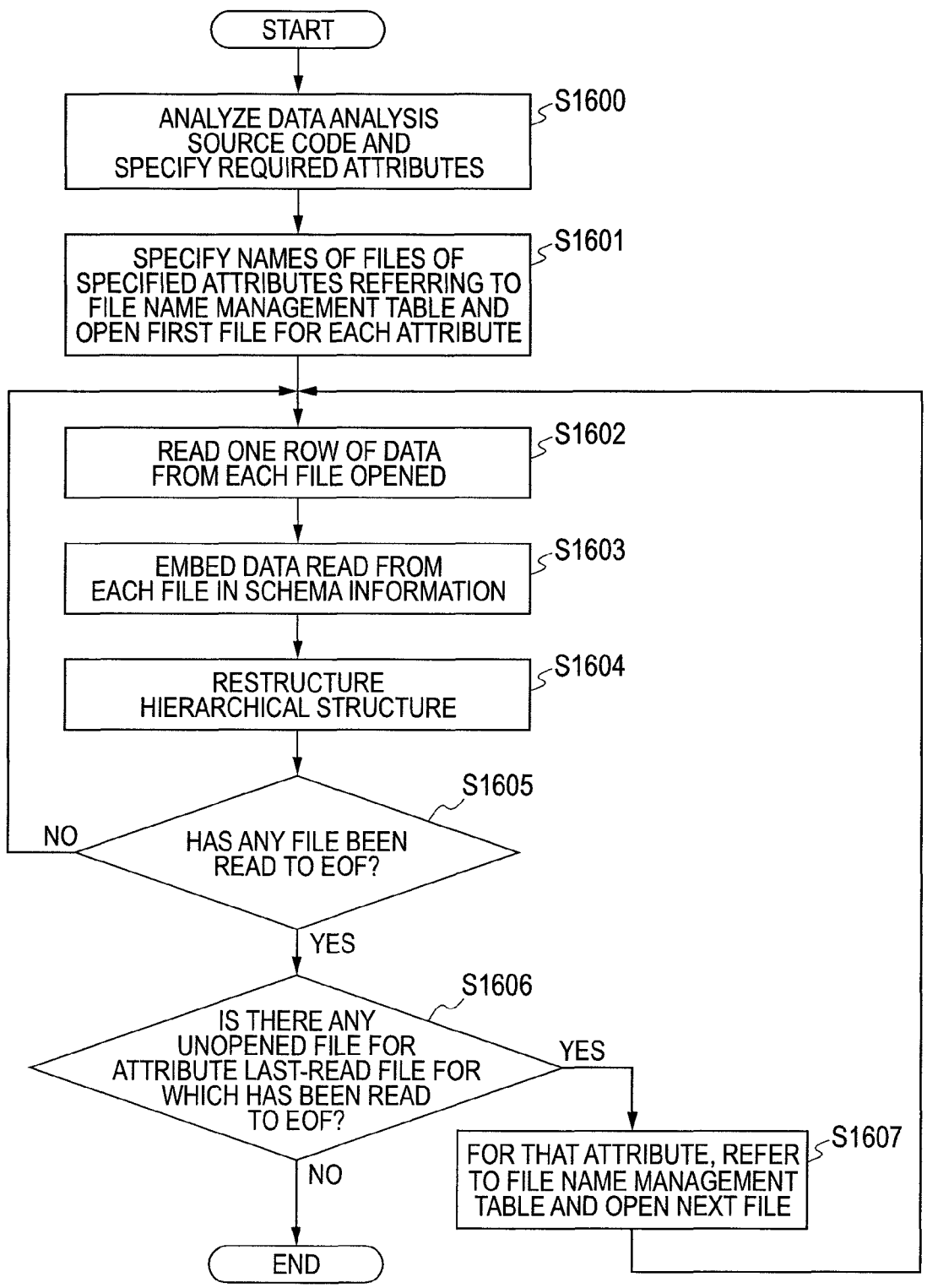
FIG. 16 is a flowchart of hierarchical data restoration processing according to the first embodiment.
Figure 17:
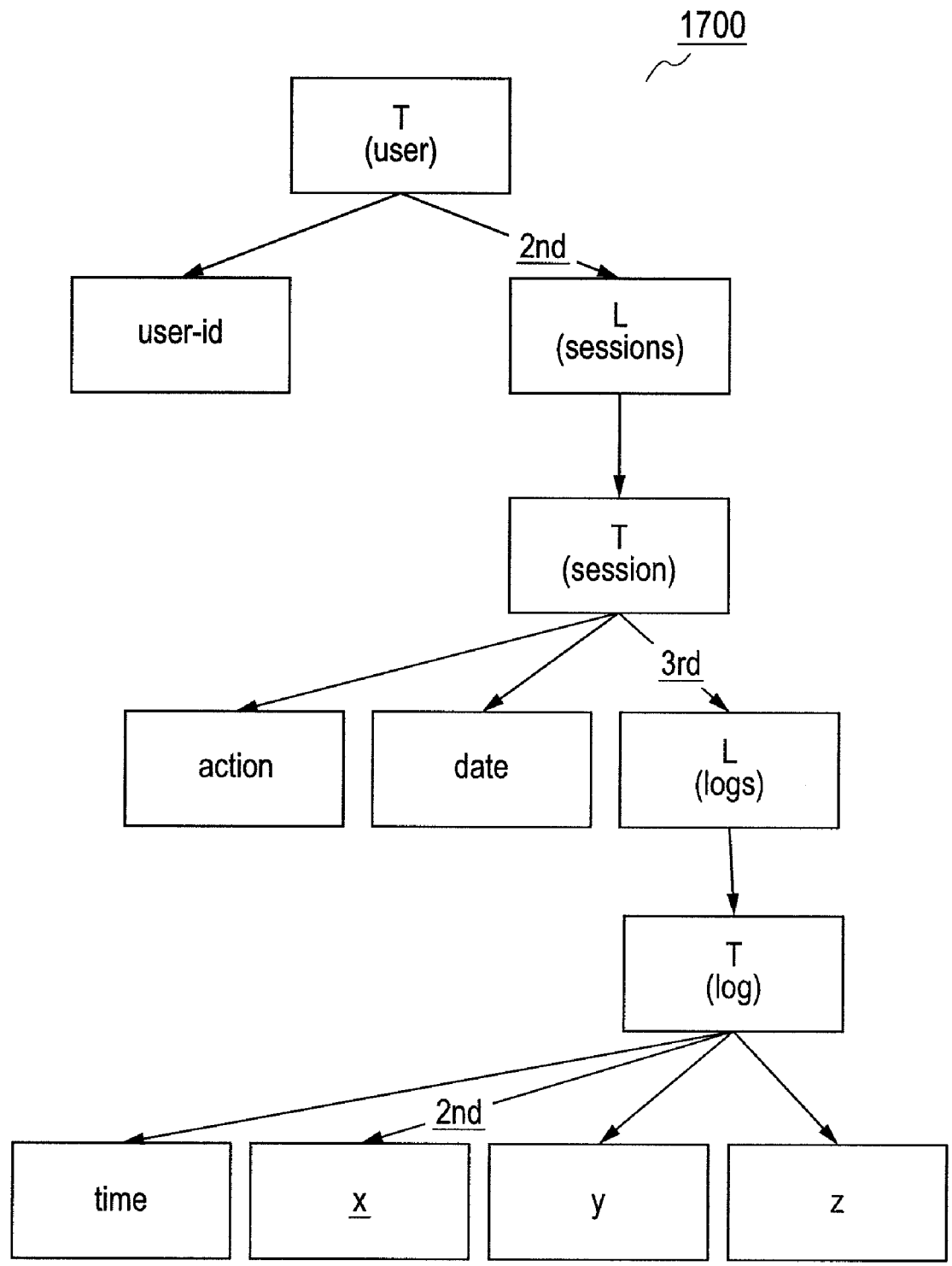
FIG. 17 shows processing to specify a required attribute according to the first embodiment.

FIG. 16 is a flowchart of the hierarchical data restoration processing 201. First, in step S1600, the data analysis source code 200 is analyzed and the names of required attributes are specified. In the data analysis program 1400 shown in FIG. 14, for example, "2nd," "3rd," and "2nd" appear, downwardly in that order in the hierarchical data structure, as functions for tracing the hierarchical data structure. Hence, based on the schema information shown in FIG. 8, tracing "2nd," "3rd," and "2nd" downwardly in the hierarchical data structure 1700 shown in FIG. 17 makes it possible to specify required attribute names. Even though in the case of the data analysis program 1400 shown in FIG. 14, only one attribute is required, two or more required attribute names can be specified in a similar manner when necessary.

Next, in step S1601, the names of files storing data of the specified attributes are specified by referring to the file name management table 900, and the first one (listed leftmost) of the files for each of the specified attributes is opened. Then, in step S1602, one row of data is read from each file opened. In the case of the attribute-based data shown in FIG. 10, each row of data corresponds to one user. Since only the attributes required for the data analysis program are read in, the amount of input data is reduced compared with cases in which all attributes are read in for each user. In the case of the example data analysis source code shown in FIG. 14, even though there are four attributes at the deepest hierarchical level, the data on only one of the four attributes is read in the data analysis program, so that the amount of input data is reduced to one fourth.

Figure 18:
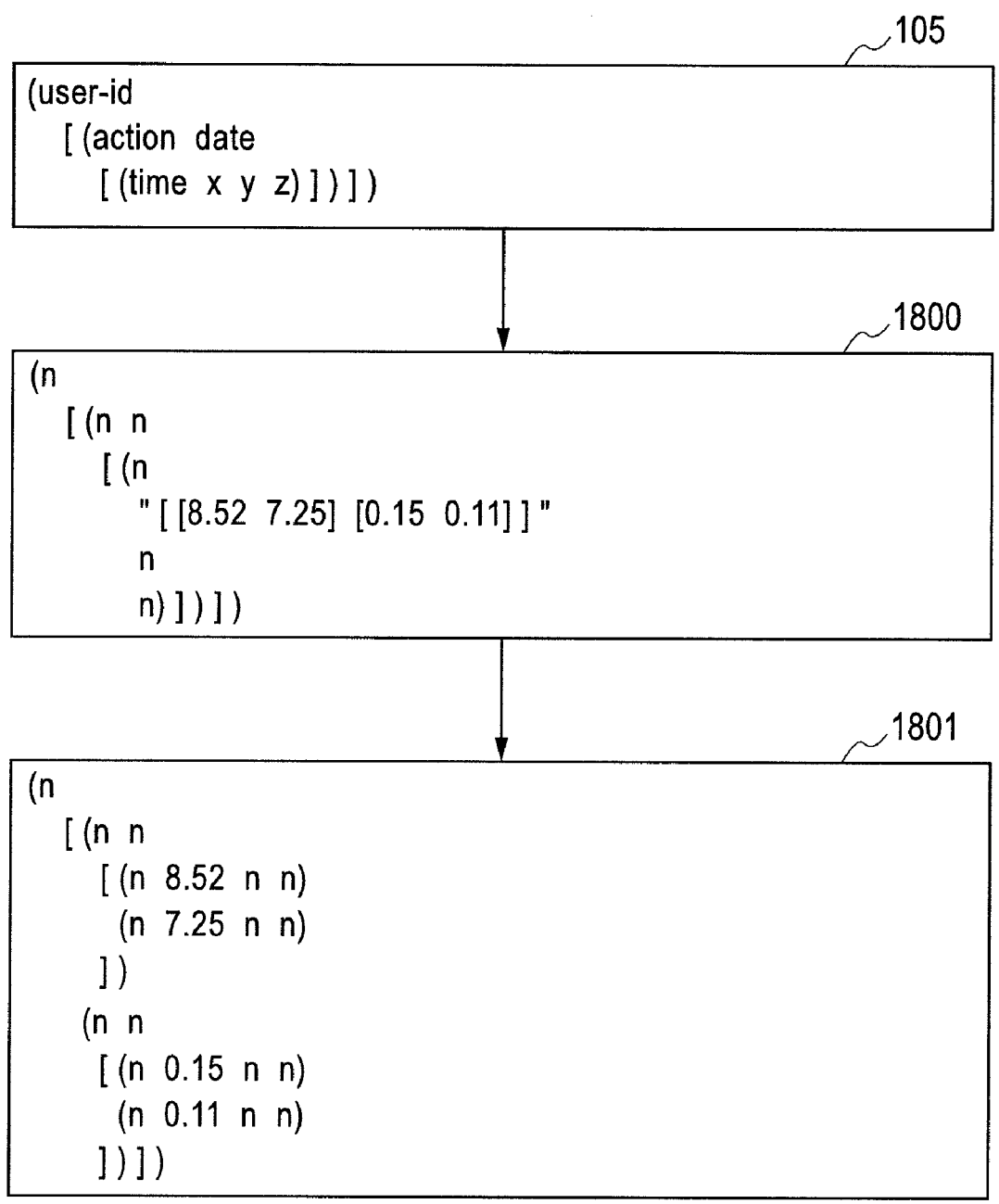
FIG. 18 shows an example operation of hierarchical data restoration processing.

Next, the data read from the opened files is embedded in the schema information in step S1603, and the hierarchical structure is restructured in step S1604. FIG. 18 shows how steps S1603 and S1604 are performed. In FIG. 18, data 1800 represents the results of embedding a one-user portion of data read, in step S1603, from file_x_0.txt (see 1002 in FIG. 10) in the schema information 105. As shown, the one-row portion of data read from file_x_0.txt is entered between quotes in the place of "x" in the schema information 105, whereas "n" is entered replacing each of the other attributes. Data 1801 shows the results of re-structuring the hierarchical data structure in step 1604. Step 1604 is executed by calling recursive function build with an argument included in, the attribute data embedded in the schema information 105. The recursive function build will be described later with reference to FIG. 19. The data 1801 is equivalent to the initial data 1500 with each value to be used in analysis processing replaced by "n." Therefore, applying the data analysis program to the data 1801 produces the same results as the results obtained by applying the data analysis program to the data 1500.

Reverting to the flowchart of the hierarchical data restoration processing 201 shown in FIG. 16, in step S1605 following step S1604, execution branches conditionally according to whether any file has been read to its end. When no file has been read to its end, execution returns to step S1602. When there is any file which has been read to its end, processing further branches, in step S1606, conditionally according to whether, for the attribute the last-read file for which has been read to its end, there is any file left to be opened. When there is no unopened file for the attribute, processing is terminated. When there is any unopened file for the attribute, the next file (to the right of the current open file) is opened by referring, regarding the attribute, to the file name management table 900 in step S1607, then execution returns to step S1602. When the files whose names are listed in the file name field of the file name management table 900 are opened one by one in the listed order, i.e. from left to right, and each of the files is read row by row, the order of users associated with the data read out agrees with the order of users indicated in the corresponding hierarchical data. Therefore, even when there are two or more attributes to be read in, when the attribute data files are read one by one from left to right and are read row by row, the correspondence between user IDs and attribute data read in step S1602 is maintained. Thus, user-based correspondence between attributes can be maintained just by sequentially reading the contents of each file. This makes it possible to read data at high speed without involving time-taking processing equivalent to, for example, relational database join operation (RDB join).

Figure 19:
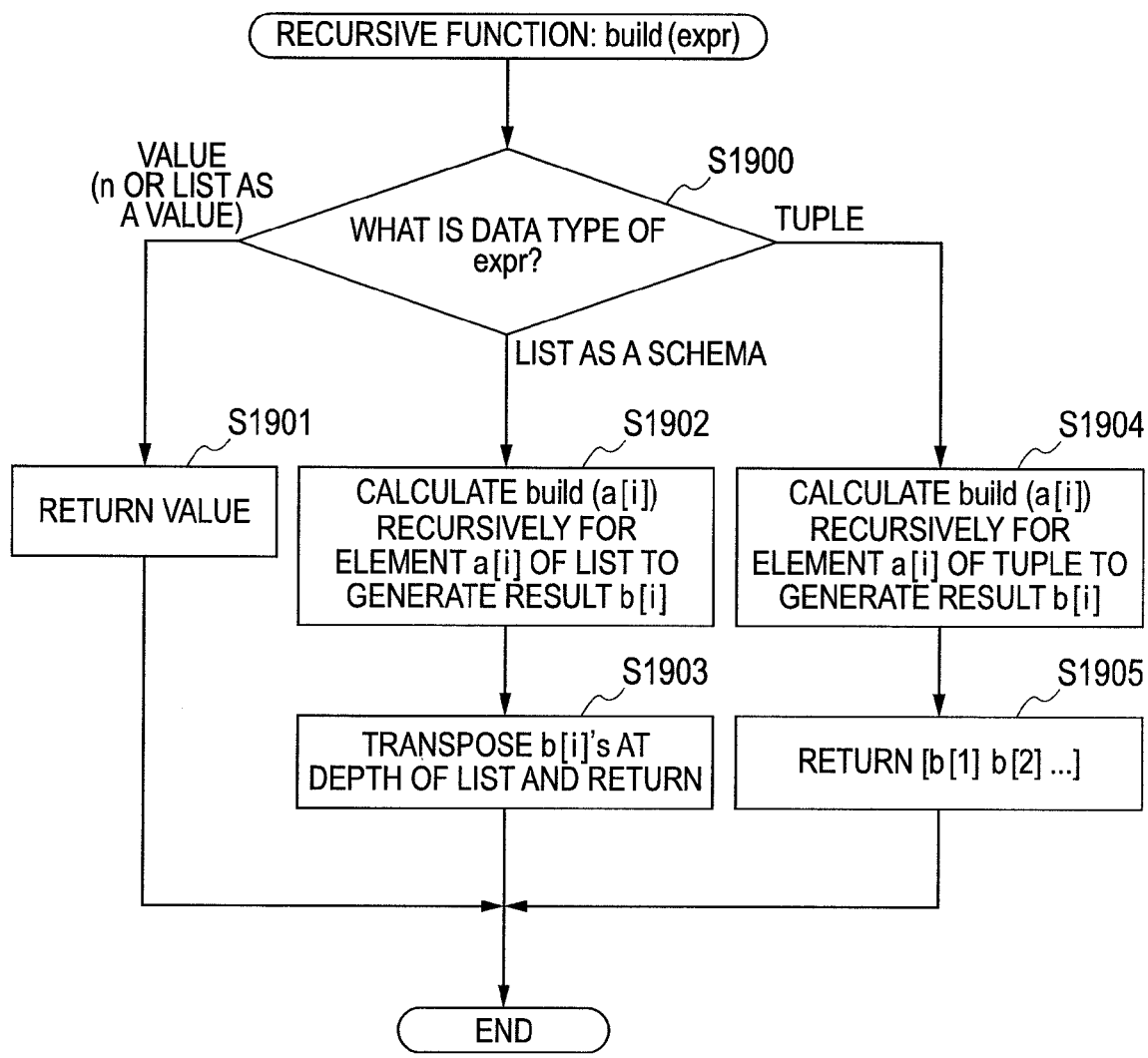
FIG. 19 is a flowchart of recursive function build according to the first embodiment.
Figure 20:
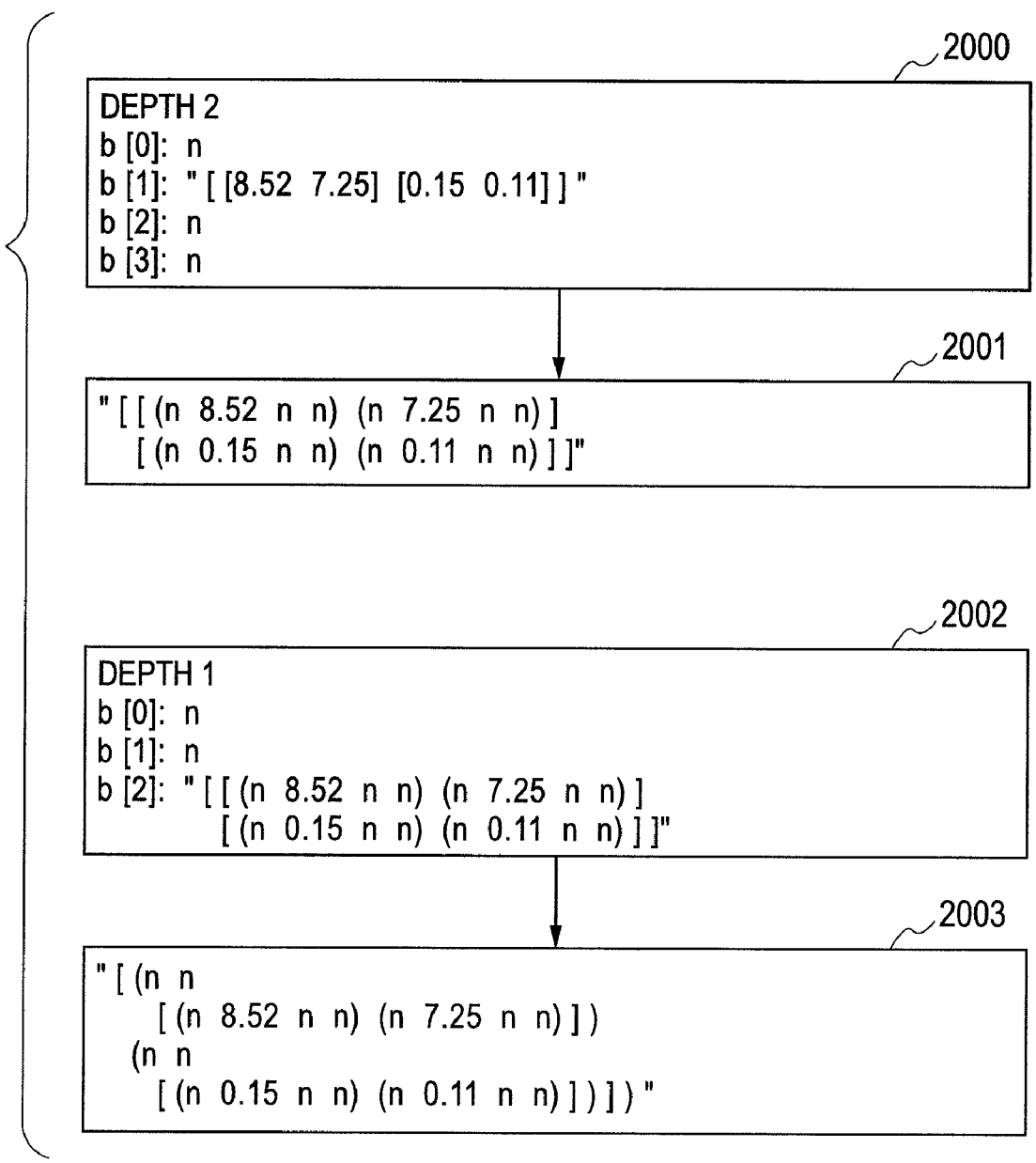
FIG. 20 shows an example of depth-specified transposition processing according to the first embodiment.

FIG. 19 is a flowchart of the recursive function build that is called in step S1604 shown in FIG. 16. In step S1604, the recursive function build is called with an argument included in the attribute data embedded in the schema information 105. First, in step S1900, execution branches conditionally according to the top argument data type in the data hierarchy. When the argument data is a value or n or a list enclosed between quotes, the argument is returned as it is in step S1901. The build function is recursively called for hierarchical data, so that, at the lowest level of a hierarchical structure, it is called with a value or n or a list enclosed between quotes as an argument. When, in step S1900 for conditional branching, the argument data type is found to be list not enclosed between quotes, build (a[i]) is recursively called for each element a[i] of the list and, in step S1902, the value calculated each time is returned as b[i]. Next, in step S1903, b[i]'s calculated in step S1902 are transposed at the depth of the list and are returned. The processing performed in step S1903 will be described in detail later with reference to FIG. 20.

When, in step S1900 for conditional branching, the argument data type is found to be tuple, build (a[i]) is recursively called for each element a[i] of the tuple, and the value calculated each time is returned as b[i] in step S1904. Then, in step S1905, the list including each element b[i] obtained in step S1904 is returned.

The processing performed in step S1903 will be described below based on an example case in which the build function is applied to the data 1800 shown in FIG. 18. When, during the process in which the build function is recursively called, build ((n "[[8.52 7.25] [0.15 0.11]]" n n)) is called, there are two pairs of brackets outside the (n "[[8.52 7.25] [0.15 0.11]]" n n) in the data 1800, that is, the depth of the hierarchical level of the list is 2. When build ((n "[[8.52 7.25] [0.15 0.11]]" n n)) is executed, first, in step S1904, the build function is executed for each element of the tuple. Since each element is either n or a list enclosed between quotes, it is returned as it is in step S1901 to generate a result as shown in data 2000 in an upper part of FIG. 20, i.e. b[0]=n, b[1]="[[8.52 7.25] [0.15 0.11]]", b[2]=n, b[3]=n. When, in this state, step S1903 is executed, since the hierarchical level of the list is at depth 2, b[i]'s are transposed at depth 2 to generate a result shown below, as also shown in data 2001 below the data 2000 in FIG. 20.

"[[(n 8.52 n n) (n 7.25 n n)]
[(n 0.15 n n) (n 0.11 n n)]]"

If, at this time, the number of elements is smaller than required, n is automatically added. When b[i]'s are transposed at depth 1, the result becomes as follows.

"[(n [8.52 7.25] n n)]
(n [0.15 0.11] n n)]"

When the results of the transposition of b[i]'s at depth 1 and at depth 2 are compared, it is known that, when b[i]'s are transposed at depth 2, the tuple reaches the depth of 2 of the list. Transposition at a specified depth is carried out by a known method. Formula manipulation software Mathematica, for example, allows the use of a built-in function to carry out depth-specified transposition.

On the other hand, when build ((n n "[[(n 8.52 n n) (n 7.25 n n)] [(n 0.15 n n) (n 0.11 n n)]]")) is called, the depth of the hierarchical level of the list is 1. Hence, b[i]'s (data 2002 shown in a lower part of FIG. 20) obtained by recursively calling the build function are transposed at depth 1 to generate a result as shown as data 2003 below the data 2002) in FIG. 20.

Figure 21:
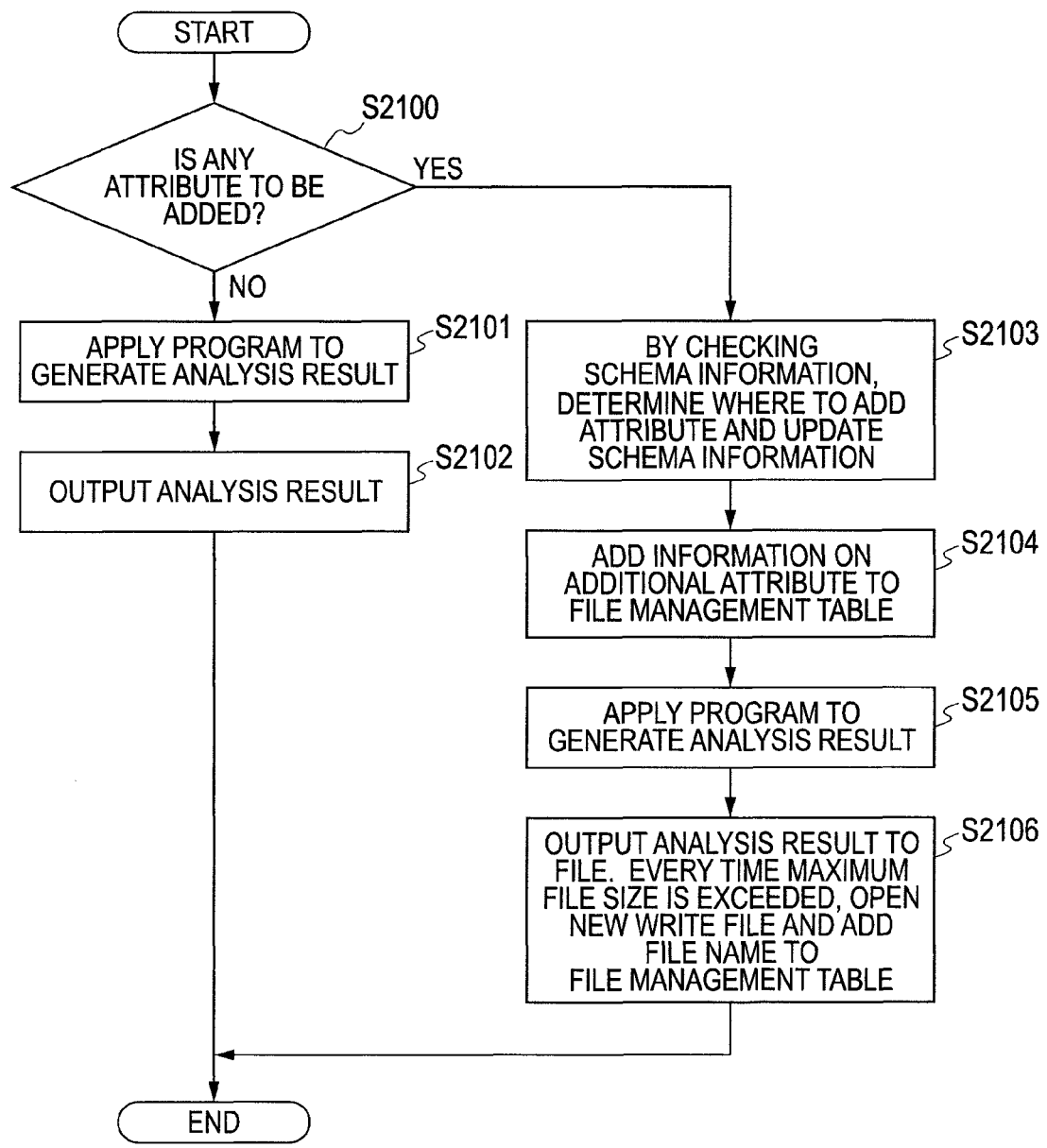
FIG. 21 is a flowchart of analysis processing according to the first embodiment.

FIG. 21 is an example flowchart of the analysis processing 203 shown in FIG. 2. First, in step S2100, execution branches conditionally according to whether any additional attribute is used in the analysis processing. When the analysis processing is determined to use no additional attribute, the data analysis source code 200 is applied, in step S2101, to the hierarchical data 202 restructured by the hierarchical data restoration processing 201 to generate an analysis result and, in step S2102, the analysis result is outputted.

Figure 22:
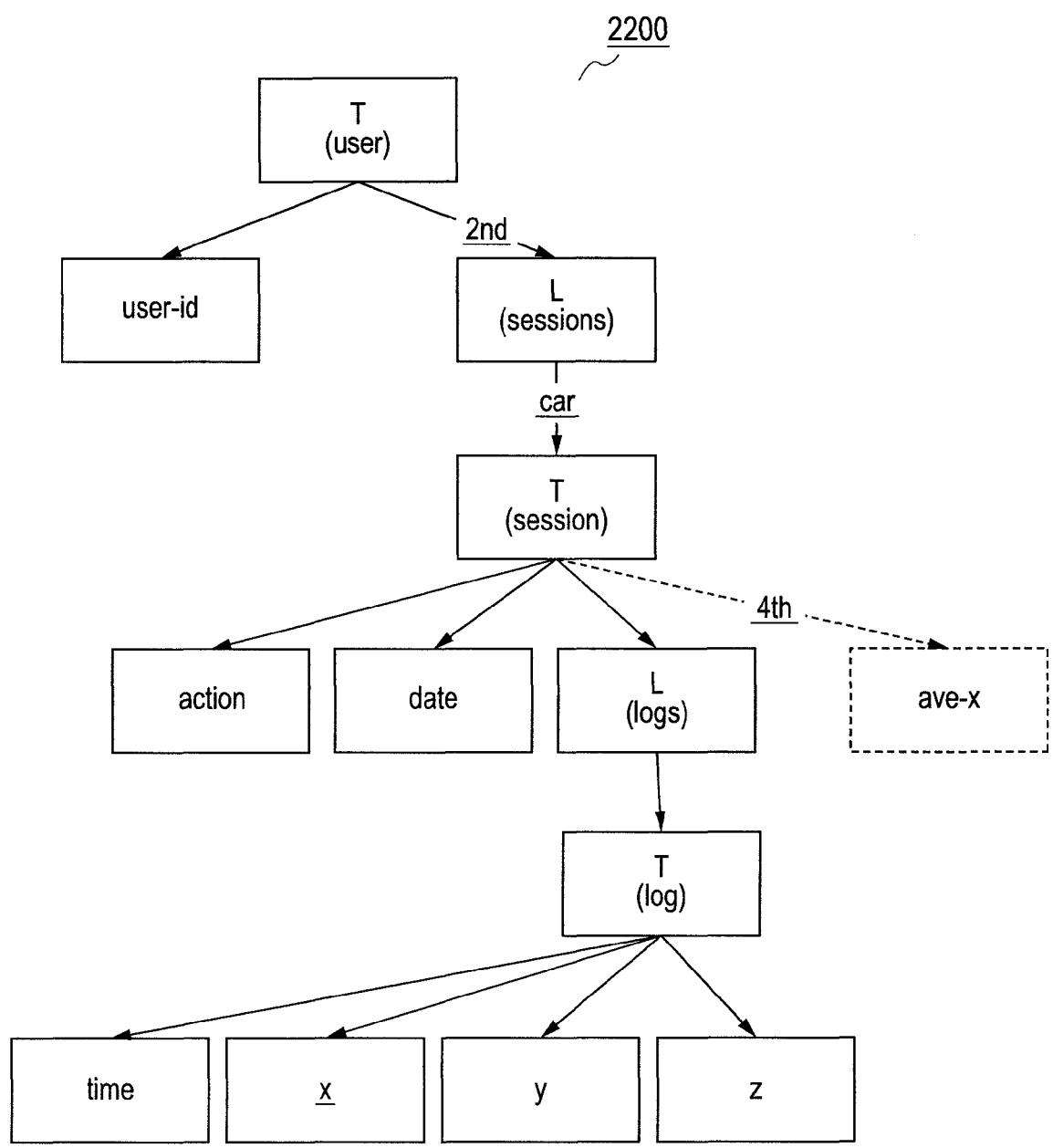
FIG. 22 shows processing for positioning an additional attribute in schema information according to the first embodiment.

When, in step S2100 for conditional branching, the analysis processing is determined to use an additional attribute, where to add the additional attribute in the schema information 105 is determined, in step S2103, by checking the schema information 105, and the schema information 105 is updated. In the case of the data analysis processing shown in FIG. 14, for example, schema structure 2200 shown in FIG. 22 is checked, according to the information (2nd (car (4th (user)))) denoted by 1401 in FIG. 14, along the directions shown in FIG. 22 to determine where to place additional attribute "ave-x." In the case of the example shown in FIG. 22, the additional attribute "ave-x" is entered in the position of the broken-line box. As a result, the schema information 105 is updated to be as follows.

(user
 [(action date
  [(time x y z)]
  ave-x)])

Next, in step S2104, information on the additional attribute is added to the file management table 900. When, for example, the attribute to be added is ave-x, a record whose attribute field showing ave-x and whose file name field showing {file_ave-x_0.txt} is added to the file management table 900. Then, in step S2105, the data analysis source code 200 is applied to the hierarchical data 202 to generate an analysis result.

Subsequently, in step S2106, the analysis result is outputted to the file. As in the case of the data division processing 103, if the file exceeds a maximum size, an additional write file is opened. Every time an additional write file is opened, its file name is added to the file management table 900. In this way in which the schema information 105 is updated as described above, only the data on each additional attribute is required to be outputted to a file, and it is not necessary to output the whole attribute data to files. The amount of data to be outputted to files can therefore reduced.

When, in step S2100 for conditional branching, the analysis processing is determined to use no additional attribute, the data analysis source code 200 is applied, in step S2101, to the restructured hierarchical data 202 to generate an analysis result and, in step S2102, the analysis result is, in step S2102, outputted to the output section, not illustrated, or is stored in the main storage 2404 or the auxiliary storage 2405.

Second Embodiment

In the second embodiment, hierarchically structured data undergoes data analysis processing at high speed in a distributed computing environment where plural computers are provided. The plural computers may include, for example, computers like the one described for the first embodiment with reference to FIG. 24.

A data processing device according to the second embodiment includes plural computers each holding schema information 105 and attribute-based data 106 in a storage section.

Each of the plural computers receives source code as a data analysis script and carries out data analysis in its CPU.

Figure 23:
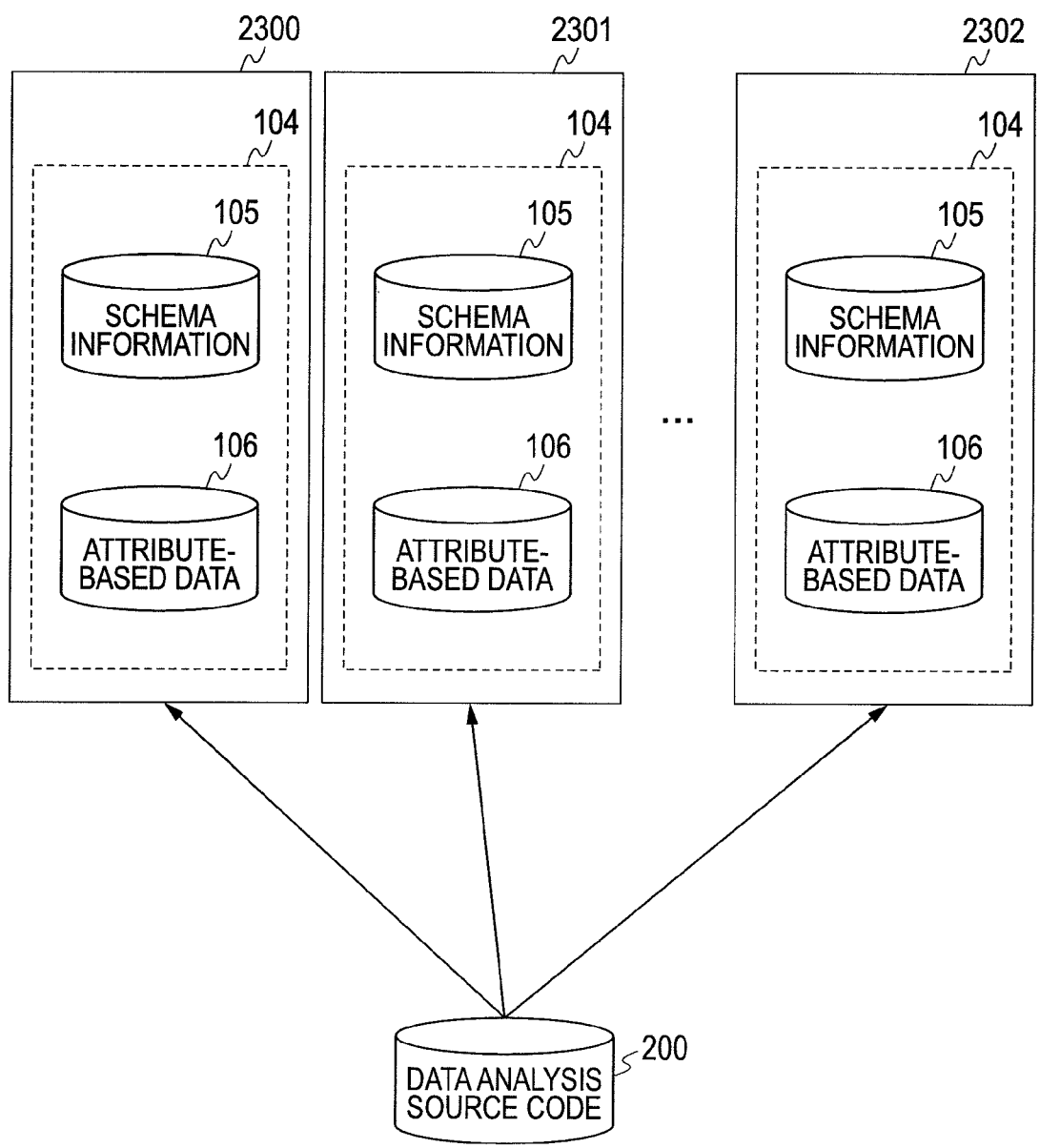
FIG. 23 shows an example system configuration in a distributed computing environment according to a second embodiment of the invention.

FIG. 23 is a block diagram showing an example configuration of the second embodiment. In FIG. 23, reference numerals 2300, 2301, and 2302 schematically represent a distributed computing environment including as many as n computers. For example, reference numeral 2300 denotes a first computer; reference numeral 2301 denotes a second computer; and reference numeral 2302 denotes an nth computer. Similarly to the first embodiment, these computers may each be a general-purpose computer configured, for example, as shown in FIG. 24. Each of the computers holds the schema information 105 and the attribute-based data 106. When the data analysis source code 200 sent by a client is received by one of the computers, data analysis is carried out on the computer using a data analysis device as shown in FIG. 2. It is obvious that the constitution of the present embodiment is feasible on many known distributed computing systems, for example, using MapReduce in a distributed computing environment.

Also, each of the computers 2300, 2301, and 2302 in a distributed computing environment may have the device shown in FIG. 1 and may perform the hierarchization processing 101 and the data division processing 103. In this case, each of the computers in a distributed computing environment is required to be provided with the raw data 100 before performing the hierarchization processing 101 and the data division processing 103.

The present invention described above relates to a data processing device and, particularly, is useful as a data processing technique for analyzing a large amount of hierarchical data at high speed.

What is claimed is:

1. A data processing device, comprising:
   a hierarchization processing section which outputs hierarchical data generated from raw data, the hierarchical data including a tuple and a list, the tuple including a combination of different data types, the list listing data of a same data type, and schema information representing a data structure of the hierarchical data;
   a data division processing section which outputs attribute-based data generated from the hierarchical data and the schema information and divided by attribute; and
   a storage section which stores the schema information outputted by the hierarchization processing section and the attribute-based data outputted by the data division processing section;
   wherein the attribute-based data stored in the storage section includes a group of files storing data and a file name management table managing file names of the group of files, each of the group of files storing data of one attribute only;
   a hierarchical data restoration processing section which outputs hierarchical data restructured by restoring an initial hierarchical structure using a data analysis script describing data analysis processing, the schema information, and the attribute-based data divided by attribute; and
   an analysis processing section which performs data analysis processing using the data analysis script and the restructured hierarchical data and outputs an analysis results;
   wherein data of each attribute stored in the group of files is, in a list format, hierarchized corresponding to a depth at which the each attribute is listed in the schema information;
   wherein, among the group of files each storing data of one attribute only, files associated with each attribute are ordered such that, by orderly opening and reading, in accordance with appropriate delimiters provided, files associated with a first optional attribute and files associated with a second optional attribute, correspondence between the first optional attribute and the second optional attribute in the hierarchical data can be restored.

2. The data processing device according to claim 1, wherein data of each attribute stored in the group of files is, in a list format, hierarchized corresponding to a depth at which the each attribute is listed in the schema information.

3. The data processing device according to claim 2, wherein, among the group of files each storing data of one attribute only, files associated with each attribute are ordered such that, by orderly opening and reading, in accordance with appropriate delimiters provided, files associated with a first optional attribute and files associated with a second optional attribute, correspondence between the first optional attribute and the second optional attribute in the hierarchical data can be restored.

4. The data processing device according to claim 3, wherein the schema information includes data type information on the hierarchical data including data type information on each element of the tuple and data type information on only a top element of the list.

5. The data processing device according to claim 1, wherein a maximum file size is set for each of the group of files.

6. The data processing device according to claim 1, wherein a plurality of computers are provided in a distributed computing environment, each of the plurality of computers having the hierarchization processing section and the data division processing section.

7. The data processing device according to claim 1, wherein the schema information includes data type information on the hierarchical data including data type information on each element of the tuple and data type information on only a top element of the list.

8. The data processing device according to claim 1, wherein a maximum file size is set for each of the group of files.

9. The data processing device according to claim 1, wherein the analysis processing section can perform attribute addition processing by updating the schema information and the file management table.

10. The data processing device according to claim 1, wherein a plurality of computers are provided in a distributed computing environment, each of the plurality of computers having the hierarchical data restoration processing section and the data analysis processing section.

11. A data processing method for a data processing device having a processing section and a storage section,
   wherein the processing section outputs hierarchical data generated by hierarchizing raw data and schema information representing a data structure of the hierarchical data; outputs, based on the hierarchical data and the schema information, attribute-based data divided by attribute; and stores the schema information and the attribute-based data in the storage section; and
   wherein the hierarchical data includes a tuple including a combination of different data types and a list listing data of a same data type; the schema information stored in the storage section includes data type information on the hierarchical data including data type information on each element of the tuple and data type information on only a top element of the list; and the attribute-based data stored in the storage section includes a group of files storing data and a file name management table for managing file names of the group of files, the each of the group of files storing data of one attribute only;

wherein data of each attribute stored in the group of files is, in a list format, hierarchized corresponding to a depth at which the each attribute is listed in the schema information;

wherein, among the group of files each storing data of one attribute only, files associated with each attribute are ordered such that, by orderly opening and reading, in accordance with appropriate delimiters provided, files associated with a first optional attribute and files associated with a second optional attribute, correspondence between the first optional attribute and the second optional attribute in the hierarchical data can be restored.

12. The data processing method according to claim 11, wherein the processing section outputs hierarchical data restructured by restoring an initial hierarchical structure using a data analysis script describing data analysis processing, the schema information, and the attribute-based data divided by attribute; performs data analysis processing using the data analysis script and the restructured hierarchical data outputted; and outputs an analysis result.

13. The data processing method according to claim 12;

wherein the processing section specifies, based on the data analysis script, an attribute required for data analysis, reads no file associated with an attribute other than the specified attribute, and changes a data structure of data hierarchized in a list read from the group of files by data transposition at a specified depth; and wherein, in the restructured hierarchical data, each attribute not required for data analysis assumes an arbitrary value.

14. The data processing method according to claim 11, wherein a maximum file size is set for each of the group of files.

15. The data processing method according to claim 11, wherein the processing section can perform attribute addition processing by updating the schema information and the file management table.

* * * * *